(12) United States Patent
Suzuki

(10) Patent No.: US 6,375,213 B1
(45) Date of Patent: Apr. 23, 2002

(54) STROLLER

(75) Inventor: Yoshiyuki Suzuki, Tokyo (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/482,272

(22) Filed: Jan. 13, 2000

(30) Foreign Application Priority Data

Sep. 27, 1999 (JP) .......................................... 11-272851
Sep. 27, 1999 (JP) .......................................... 11-272852
Sep. 27, 1999 (JP) .......................................... 11-272853

(51) Int. Cl.$^7$ .............................. B62B 7/06; B62K 21/16
(52) U.S. Cl. ...................... 280/649; 280/642; 280/650; 74/551.3
(58) Field of Search ................................ 280/649, 642, 280/650, 42, 47.38, 47.4, 47.371; 297/42, 44, 45; 74/501.6, 551.3

(56) References Cited

U.S. PATENT DOCUMENTS

| | | | | |
|---|---|---|---|---|
| 4,049,292 A | * | 9/1977 | Perego .......................... 280/642 |
| 4,118,052 A | * | 10/1978 | Cabagnero .................... 280/642 |
| 4,335,893 A | * | 6/1982 | Carmichael et al. .......... 280/42 |
| 4,362,315 A | * | 12/1982 | Kassai .......................... 280/650 |
| 4,542,916 A | * | 9/1985 | Kassai .......................... 280/642 |
| 4,619,542 A | * | 10/1986 | Kassai .......................... 280/644 |
| 4,682,783 A | * | 7/1987 | Kuschall ...................... 280/242 |
| 5,472,224 A | * | 12/1995 | Cabagnero .................... 280/642 |
| 5,511,441 A | * | 4/1996 | Arai ............................. 74/501.6 |
| 5,524,503 A | * | 6/1996 | Ishikura ....................... 74/501.6 |
| 5,622,376 A | * | 4/1997 | Shamie ......................... 280/642 |
| 5,669,623 A | * | 9/1997 | Onishi .......................... 280/642 |
| 5,769,447 A | * | 6/1998 | Huang .......................... 280/642 |
| 5,772,234 A | * | 6/1998 | Luo .............................. 280/642 |
| 5,845,924 A | * | 12/1998 | Huang .......................... 280/642 |
| 5,863,061 A | * | 1/1999 | Ziegler et al. ............... 280/642 |
| 6,105,997 A | * | 8/2000 | Watkins ....................... 280/649 |

* cited by examiner

Primary Examiner—Lanna Mai
Assistant Examiner—Jeff Restifo
(74) Attorney, Agent, or Firm—Whitham, Curtis & Christofferson

(57) ABSTRACT

A stroller includes two right and left front legs respectively having front wheels mounted on the lower ends thereof, two right and left rear legs having rear wheels mounted on the rear ends thereof, two right and left hand-push frames, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders, a first open/close link formed in an X shape and mounted rotatably between said upper holders of said two front legs and the rear portions of said two rear legs, a second open/close link formed in an X shape and mounted rotatably between the lower ends of said two hand-push frames and the substantially central portions of said two rear legs, and a connecting portion connecting said horizontal portions of said two hand-push frames together through their joint portions and cooperating with said horizontal portions of said two hand-push frames in forming a grip portion.

39 Claims, 13 Drawing Sheets

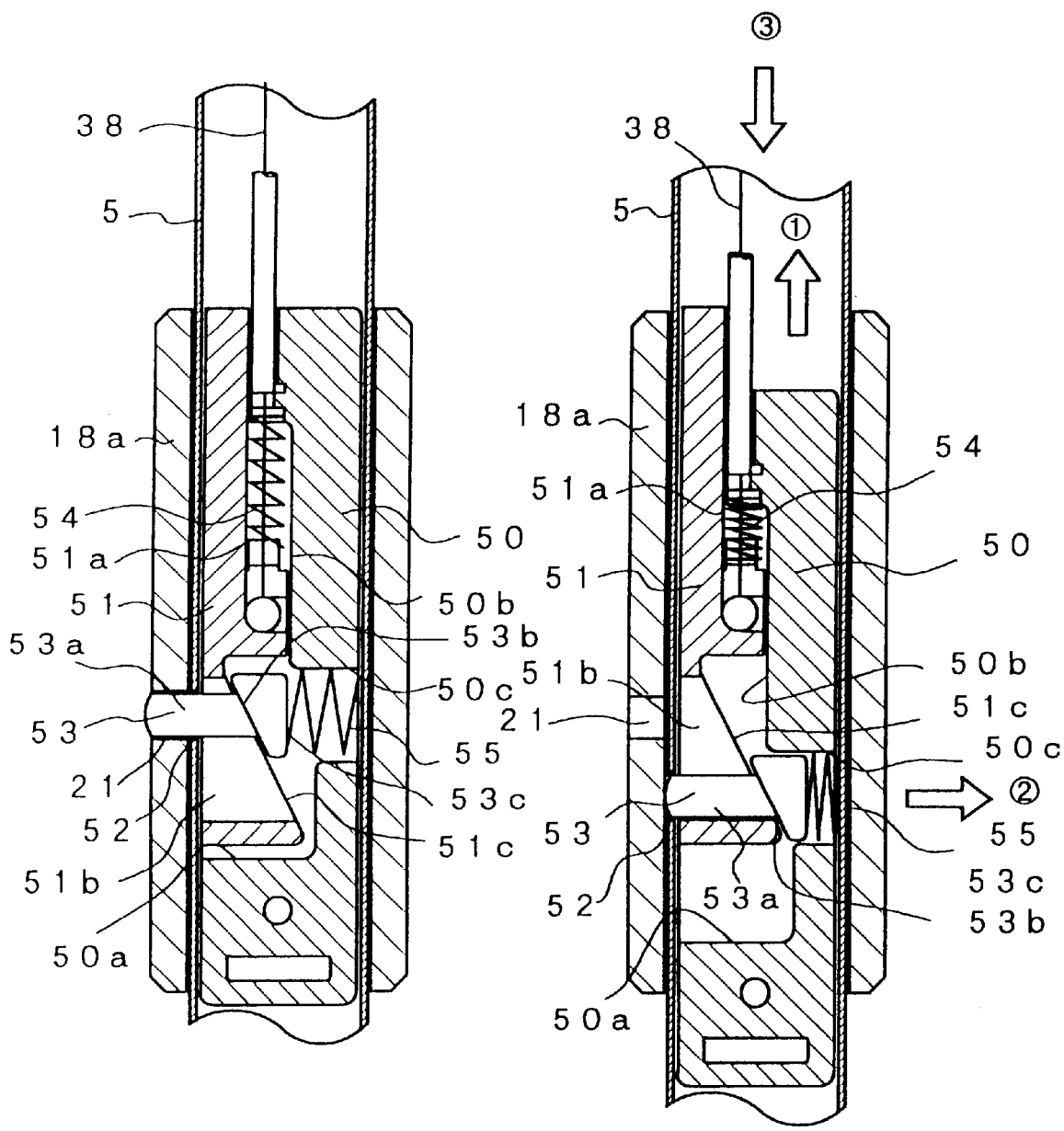

STROLLER

BACKGROUND OF THE INVENTION

1. Field of the Invention

The present invention relates to a stroller which can be easily folded up into a compact size when it is not in use.

2. Related Art

A stroller of a folding type, which is referred to as a baby carriage or a baby buggy, is basically structured on the basis of a similar principle to a folding chair of a pipe frame type: that is, front and rear frames with casters mounted thereon can be folded and developed, the right and left sides of the front and rear frames can also be folded and developed to thereby reduce the width dimension thereof, and, in the thus folded or contracted state of the stroller, the upper end portions of the front and rear frames form an L-like shape which can be used as the carrying handle of the stroller, so that a user can carry the stroller with the L-shaped portion put on her or his arm when the user gets on and off a train, a bus or the like.

In this structure, the height dimension of the stroller is based on such height that, when in use, is easy for an adult to push the stroller by hand while putting her or his hand on the L-shaped handle formed on the frame upper end portion put on the arm. Therefore, when folded up, the height dimension of the stroller remains unchanged and thus, when carrying the stroller, the casters of the stroller frames touch the ground to thereby make it difficult to carry the stroller, so that the user has to hold the arm high in carrying the stroller, thereby worsening the carrying performance of the stroller when carrying it for a long time.

To solve this problem, for example, in Japanese Patent No. 2572278, there is disclosed a structure in which, to reduce the height dimension of a stroller, a front frame thereof is so formed as to be foldable in the middle portion thereof.

However, according to the present structure, to fold the stroller, a lock button disposed on an handle is firstly removed, the handle is next folded, and then a guard is folded. That is, this operation is not easy.

Also, since the stroller cannot be locked in its folded condition nor a folding lock mechanism can be actuated automatically even in the developed condition of the stroller, the stroller must be locked using a hand-operated lock button, which raises a possibility that there can occur an not expected accident due to failure of operation.

Further, in addition to the fact that the folding and developing operation of the stroller is troublesome and the structure thereof is complicated, when the stroller is in its folded-up condition, the front frame projects forwardly in a dogleg shape, which is not preferable from the viewpoint of reduction in the longitudinal direction dimension of the stroller; that is, the present structure is poor in practicability.

In addition, while the footrest itself of the stroller is complicated in structure, the footrest is difficult to fold and, if the footrest is made easy to fold, then the strength thereof is too low; that is, the footrest is also poor in practicability.

SUMMARY OF THE INVENTION

The present invention aims at solving the above-mentioned technical problems found in the conventional strollers. Accordingly, it is an object of the invention to provide a footrest for use in a stroller, which is simple in structure, easy to fold and high in strength. And, it is another object of the invention to provide a stroller which not only is capable of mounting the above footrest thereon but also, when folded up, is able to reduce the sizes of frames thereof by means of a simple sliding operation and, in the folding and developing operation, can be locked and unlocked automatically.

Another object of the present invention, there is provided a stroller such that when a stroller is folded, the frame becomes compact through an easy operation, and further, during a folding or developing operation, the lock or unlock operation is automatically carried out. Specifically, the grip portion includes the operating mechanism having a lock lever slidably moving in a housing, a lock releasing (also referred to as removing) lever rotatably mounted in the housing so that the folding operation is easily prohibited and the prohibition off folding operation is easily released. Furthermore, the hand-push frame includes a rock pin projecting/escaping mechanism and release mechanism connecting the operation mechanism and the rock pin projecting/escaping mechanism so that the slide control of the hand-push frame is carried out by the operation mechanism mounted in the grip portion to simplify the operation of the folding and developing.

According to the first aspect of the present invention, there is provided a stroller comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close link being supported by a pin; and, a connecting portion connecting said horizontal portions of said two hand-push frames together through their joint portions and cooperating with said horizontal portions of said two hand-push frames in forming a grip portion.

According to the second aspect of the present invention, a stroller as set forth in the first aspect of the present invention, further comprising:

two armrest base portions respectively fixed to said two front legs and an armrest connected inclinably through fulcrum pins to the lower end portions of said two armrest base portions, wherein, in folding said stroller, said armrest base portions and said armrest are folded to thereby be able to fold said stroller automatically.

According to the third aspect of the present invention, a stroller as set forth in the first aspect of the present invention, further comprises: a flexible guard circle is mounted between said two front legs.

According to the fourth aspect of the present invention, a stroller as set forth in the second aspect of the present invention, further comprises: a flexible guard circle is mounted between said two front legs.

According to the fifth aspect of the present invention, a stroller as set forth in the first to fourth aspect of the present invention, further comprises: a flexible sun visor mounted between two visor support rods respectively provided on the upper ends of said vertical portions of said two hand-push frames and extended therefrom in the advancing direction of said stroller.

According to the sixth aspect of the present invention, a stroller including in a grip portion thereof an operation mechanism for locking a folding operation and removing such locking, said operation mechanism comprising:
a housing including:
a space capable of storing a member therein;
a lock lever disposed slidably in said housing;
a securing pawl having a large thickness and disposed in the leading end portion of said lock lever;
a lock removing lever disposed rotatably within said housing;
a pressing portion formed in a portion of said lock removing lever and exposed externally of said housing;
an operation portion formed in another portion of said lock removing lever and capable of pressing against said securing pawl; and
a release wire securing portion disposed in a member formed integrally with said lock removing lever,
when said lock lever is not allowed to slide, said securing pawl prevents said operation portion of said lock removing lever against rotation to thereby prevent the rotation of said pressing portion of said lock removing lever, so that said release wire securing portion is also prevented against rotation, and,
if said lock lever is slid, said securing pawl is moved to thereby allow said operation portion of said lock removing lever to rotate, so that said pressing portion of said lock removing lever is allowed to rotate and thus said release wire securing portion is also allowed to rotate.

According to the seventh aspect of the present invention, there is provided a stroller including in a grip portion thereof an operation mechanism for locking a folding operation and unlocking the folding operation, said operation mechanism comprising:

a spring for normally energizing said lock lever to the locking position side, and, on the moving leading-end side of said securing pawl of said lock lever; and an extension portion formed projectingly within said housing and an engaging groove formed in the vicinity of the leading end of said extension portion, wherein if said lock lever is slid, then said securing pawl of said lock lever is moved to run up onto said extension portion and is thereafter engaged with said engaging groove and, if said pressing portion of said lock removing lever is further rotated, said securing pawl is moved by said spring to run up onto said extension portion again and is thereafter pulled back to the locking position side automatically.

According to the eighth aspect of the present invention, there is provided a stroller comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an x shape and mounted rotatably between the lower ends of said two hand-push frames and the substantially central portions of said two rear legs, the intersecting central portion of said second open/close link being supported by a pin; and, a connecting portion connecting said horizontal portions of said two hand-push frames together through their joint portions and cooperating with said horizontal portions of said two hand-push frames in forming a grip portion, an operation mechanism included in said connecting portion, said operation mechanism comprising:
a housing including:
a space capable of storing a member therein;
a lock lever disposed slidably in said housing;
a securing pawl having a large thickness and disposed in the leading end portion of said lock lever;
a lock removing lever disposed rotatably within said housing;
a pressing portion formed in a portion of said lock removing lever and exposed externally of said housing;
an operation portion formed in another portion of said lock removing lever and capable of pressing against said securing pawl; and
a release wire securing portion disposed in a member formed integrally with said lock removing lever,
when said lock lever is not allowed to slide, said securing pawl prevents said operation portion of said lock removing lever against rotation to thereby prevent the rotation of said pressing portion of said lock removing lever, so that said release wire securing portion is also prevented against rotation, and,
if said lock lever is slid, said securing pawl is moved to thereby allow said operation portion of said lock removing lever to rotate, so that said pressing portion of said lock removing lever is allowed to rotate and thus said release wire securing portion is also allowed to rotate.

According to the ninth aspect of the present invention, there is provided a stroller comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close link being supported by a pin; and, a connecting portion connecting said horizontal portions of said two hand-push frames together through their joint portions and cooperating with said horizontal portions of said two hand-push frames in forming a grip portion, an operation mechanism included in said connecting portion, said operation mechanism comprising:

a spring for normally energizing said lock lever to the locking position side, and, on the moving leading-end side of said securing pawl of said lock lever; and an extension portion formed projectingly within said housing and an engaging groove formed in the vicinity of the leading end of said extension portion, wherein if said lock lever is slid, then said securing pawl of said lock lever is moved to run up onto said extension portion and is thereafter engaged with said engaging groove and, if said pressing portion of said lock removing lever is further rotated, said securing pawl is moved by said spring to run up onto said extension portion again and is thereafter pulled back to the locking position side automatically.

According to the tenth aspect of the present invention, in a stroller as set forth in the eighth aspect of the present invention, wherein, in said hand-push frames, there is included a lock pin projecting and retreating mechanism which, when said connecting portion is held linear with the upper portions of said hand-push frames, can be engaged with said upper holders, and also which, if said hand-push frames are rotated as the result of the lock removing operation of said connecting portion, can remove its engagement with said upper holders, and also wherein, in said hand-push frames, there is further included a release mechanism for connecting said operation mechanism to said lock pin projecting and retreating mechanism.

According to the eleventh aspect of the present invention, in a stroller as set forth in the ninth aspect of the present invention, wherein, in said hand-push frames, there is included a lock pin projecting and retreating mechanism which, when said connecting portion is held linear with the upper portions of said hand-push frames, can be engaged with said upper holders, and also which, if said hand-push frames are rotated as the result of the lock removing operation of said connecting portion, can remove its engagement with said upper holders, and also wherein, in said hand-push frames, there is further included a release mechanism for connecting said operation mechanism to said lock pin projecting and retreating mechanism.

According to the twelfth aspect of the present invention, there is provided a footrest comprising:

two footrest support arms connected to each other in their respective central portions and foldable in the central portions thereof only in the upward direction; and a locking mechanism for locking said two footrest support arms in a horizontal state and a lock removing mechanism for removing said locking of said two footrest support arms.

According to the thirteenth aspect of the present invention, in the footrest as set forth in the twelfth aspect of the present invention, wherein said locking mechanism is structured such that a securing pawl disposed in a moving block is allowed to move into a clearance produced in the vicinity of a connecting portion when said two support arms are held in said horizontal state.

According to the fourteenth aspect of the present invention, in the footrest as set forth in the thirteenth aspect of the present invention, wherein said lock removing mechanism is capable of retreating said securing pawl from said clearance produced in the vicinity of said connecting portion when said two support arms are held in said horizontal state.

According to the fifteenth aspect of the present invention there is provided a stroller comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close link being supported by a pin;

a connecting portion connecting said horizontal portions of said two hand-push frames together through their joint portions and cooperating with said horizontal portions of said two hand-push frames in forming a grip portion, and an operation mechanism which is disposed in said connecting portion and can be operated by hand to lock the rotation of said hand-push frames and remove said locking, a footrest including:

two footrest support arms connected to each other in their respective central portions and foldable in the central portions thereof only in the upward direction; and a locking mechanism for locking said two footrest support arms in a horizontal state and a lock removing mechanism for removing said locking of said two footrest support arms.

According to the sixteenth aspect of the present invention, in the stroller as set forth in the fifteenth aspect of the present invention, wherein said locking mechanism is structured such that a securing pawl disposed in a moving block is allowed to move into a clearance produced in the vicinity of a connecting portion when said two support arms are held in said horizontal state.

According to the seventeenth aspect of the present invention, in the stroller as set forth in the sixteenth aspect of the present invention, wherein said lock removing mechanism is capable of retreating said securing pawl from said clearance produced in the vicinity of said connecting portion when said two support arms are held in said horizontal state.

According to the eighteenth aspect of the present invention, there is provided a stroller comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close link being supported by a pin;

a connecting portion connecting said horizontal portions of said two hand-push frames together through their joint portions and cooperating with said horizontal portions of said two hand-push frames in forming a grip portion;

an operation mechanism which is disposed in said connecting portion and can be operated by hand to lock the rotation of said hand-push frames and remove said locking;

a lock pin projecting and retreating mechanism fixed to the inside of said hand-push frames in such a manner that, when said connecting portion is held linear with the upper portions of said hand-push frames, it can be engaged with said upper holders and, if said hand-push frames are rotated as the result of the lock removing operation of said connecting portion, it can be removed from its engagement with said upper holders; and a release mechanism disposed within said hand-push frames for connecting said operation mechanism to said lock pin projecting and retreating mechanism; and a footrest including:
two footrest support arms connected to each other in their respective central portions and foldable in the central portions thereof only in the upward direction; and a locking mechanism for locking said two footrest support arms in a horizontal state and a lock removing mechanism for removing said locking of said two footrest support arms.

According to the nineteenth aspect of the present invention, in the stroller as set forth in the eighteenth aspect of the present invention, wherein said locking mechanism is structured such that a securing pawl disposed in a moving block is allowed to move into a clearance produced in the vicinity of a connecting portion when said two support arms are held in said horizontal state.

According to the twentieth aspect of the present invention, in the stroller as set forth in the nineteenth aspect of the present invention, wherein said lock removing mechanism is capable of retreating said securing pawl from said clearance produced in the vicinity of said connecting portion when said two support arms are held in said horizontal state.

According to the twenty-first aspect of the present invention, in the stroller as set forth in the fifteenth aspect of the present invention, wherein said footrest is mounted on the lower portions of said two front legs in such a manner that the two ends of said footrest can be rotated.

According to the twenty-second aspect of the present invention, in the stroller as set forth in the sixteenth aspect of the present invention, wherein said footrest is mounted on the lower portions of said two front legs in such a manner that the two ends of said footrest can be rotated.

According to the twenty-third aspect of the present invention, in the stroller as set forth in the seventeenth aspect of the present invention, wherein said footrest is mounted on the lower portions of said two front legs in such a manner that the two ends of said footrest can be rotated.

According to the twenty-fourth aspect of the present invention, in the stroller as set forth in the eighteenth aspect of the present invention, wherein said footrest is mounted on the lower portions of said two front legs in such a manner that the two ends of said footrest can be rotated.

According to the twenty-fifth aspect of the present invention, in the stroller as set forth in the nineteenth aspect of the present invention, wherein said footrest is mounted on the lower portions of said two front legs in such a manner that the two ends of said footrest can be rotated.

According to the twenty-sixth aspect of the present invention, in the stroller as set forth in the twentieth aspect of the present invention, wherein said footrest is mounted on the lower portions of said two front legs in such a manner that the two ends of said footrest can be rotated.

According to the twenty-seventh aspect of the present invention, in the footrest as set forth in the twelfth aspect of the present invention, further comprising:

According to the twenty-eighth aspect of the present invention, in the footrest as set forth in the thirteenth aspect of the present invention, further comprising:

a release mechanism for operating said locking and lock removing mechanisms.

According to the twenty-ninth aspect of the present invention, in the footrest as set forth in the fourteenth aspect of the present invention, further comprising:

a release mechanism for operating said locking and lock removing mechanisms.

According to the thirtieth aspect of the present invention, there is provided a stroller, comprising:

two right and left front legs respectively having front wheels mounted on the lower ends thereof;

two right and left rear legs respectively not only having their upper portions supported rotatably on the substantially central portions of said front legs but also having rear wheels mounted on the rear ends thereof;

two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close link being supported by a pin;

a connecting portion connecting said horizontal portions of said two hand-push frames together through their joint portions and cooperating with said horizontal portions of said two hand-push frames in forming a grip portion;

an operation mechanism which is disposed in said connecting portion and can be operated by hand to lock the rotation of said hand-push frames and remove said locking;

a lock pin projecting and retreating mechanism fixed to the inside of said hand-push frames in such a manner that, when said connecting portion is held linear with the upper portions of said hand-push frames, it can be engaged with said upper holders and, if said hand-push frames are rotated as the result of the lock removing operation of said connecting portion, it can be removed from its engagement with said upper holders; and a release mechanism disposed within said hand-push frames for connecting said operation mechanism to said lock pin projecting and retreating mechanism;

a footrest including:

two footrest support arms connected to each other in their respective central portions and foldable in the central portions thereof only in the upward direction;

an auxiliary release mechanism for operating said locking and lock removing mechanisms; and a locking mechanism for locking said two footrest support arms in a horizontal state and a lock removing mechanism for removing said locking of said two footrest support arms, and the operation of said auxiliary release mechanism of said footrest is linked with the vertical movements of said two hand-push frames.

According to the thirty-first aspect of the present invention, in the stroller as set forth in the thirtieth aspect of the present invention, wherein said locking mechanism is structured such that a securing pawl disposed in a moving block is allowed to move into a clearance produced in the vicinity of a connecting portion when said two support arms are held in said horizontal state.

According to the thirty-second aspect of the present invention, in the stroller as set forth in the thirty-first aspect of the present invention, wherein said lock removing mechanism is capable of retreating said securing pawl from said clearance produced in the vicinity of said connecting portion when said two support arms are held in said horizontal state.

BRIEF DESCRIPTION OF THE DRAWINGS

FIGS. 7 are enlarged views of the upper portion of a hand-push frame used in the stroller; in particular.

FIG. 9 are explanatory views of the operation order of the above operation mechanism; in particular.

FIG. 10 are section views of the operation states of a lock pin projecting and retreating mechanism provided in the vicinity of the central portion of the vertical lower portion of the hand-push frame; in particular, FIG. 10(a) shows the operation state thereof in locking, and FIG. 10(b) shows the operation state thereof in unlocking;

DETAILED DESCRIPTION OF PREFERRED EMBODIMENTS

Now, description will be given below in detail of the preferred embodiments according to the invention with reference to the accompanying drawings.

Figure 1:
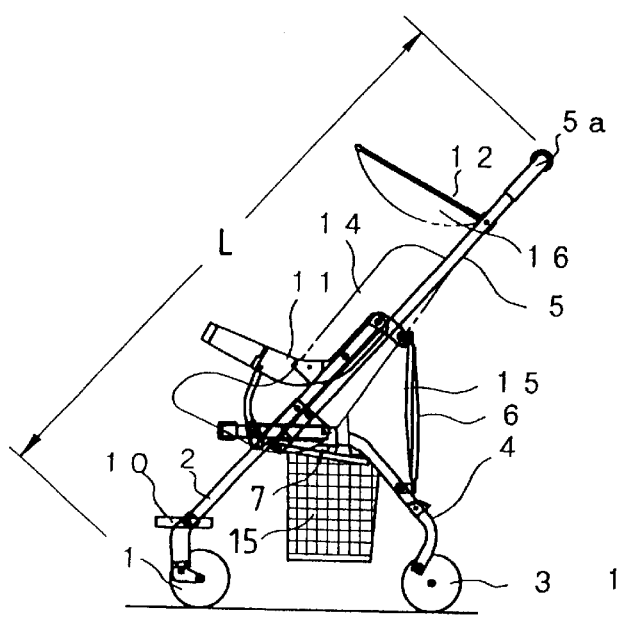
FIG. 1 is side and front views of a stroller according to the invention; in particular, FIGS. 1(a1 and a2) is side and front views thereof, showing its developed state, and FIGS. 1(b1 and b2) is side and front views thereof, showing its folded state.
Figure 1:
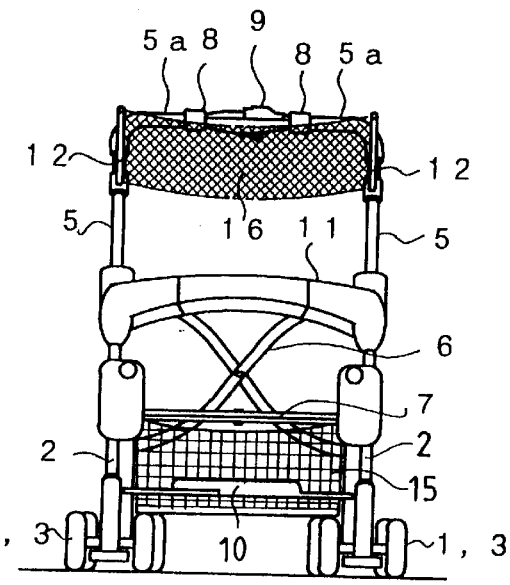
Figure 1:
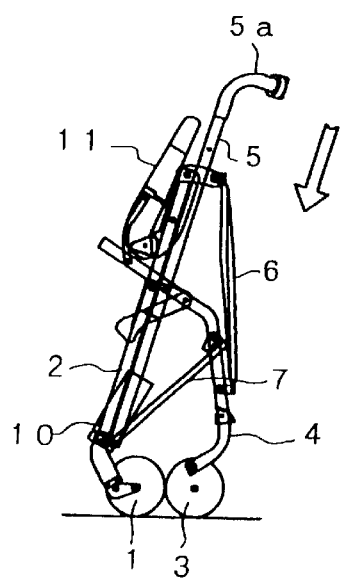
Figure 1:
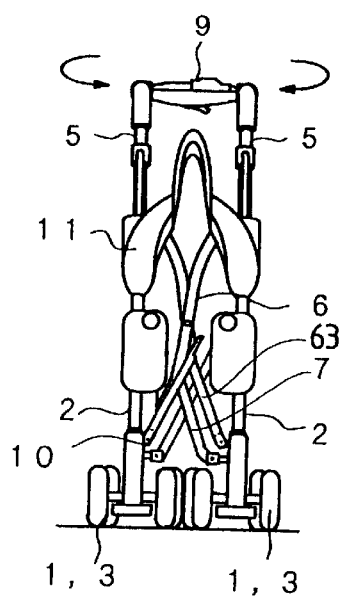

FIGS. 1(a1, a2) to (b1, b2) are side and front views of a general structure of an embodiment of a stroller according to the invention. In more particular, FIGS. 1(a1, a2) show a developed state of the stroller, and FIGS. 1(b1, b2) show a folded state of the stroller.

The stroller shown in FIG. 1 includes generally two right and left front legs 2 each including a front wheel 1 in the lower end thereof, two right and left rear legs 4 each including a rear wheel 3 in the rear end thereof, two hand-push frames 5 which are respectively supported on their associated front legs 2 in such a manner that they can be slid in parallel to the front legs 2 and rotated in their respective peripheral directions, a first open/close link 6 which is rotatably interposed between the upper holders of the two front legs 2 and the rear portions of the two rear legs 4 in such a manner that the two components thereof intersect each other in the central portions thereof to thereby form an X shape and the intersecting central portion thereof is supported by a pin, and a second open/close link 7 which is rotatably interposed between the lower ends of the two hand-push frames 5 and the substantially central portions of the two rear legs 4 in such a manner that the two components thereof intersect each other in the central portions thereof to thereby form an X shape and the intersecting central portions is supported by a pin.

The front legs 2, rear legs 4, and hand-push frames 5 are respectively made of a light-weight aluminum hollow pipe, a steel pipe or the like.

And, the two front legs 2 are respectively formed in a linear shape or are respectively curved in their lower end portions, while the two rear legs 4 are respectively curved in part; and, the two front wheels 1 and two rear wheels 3 are respectively mounted on the lower end portions of their associated front and rear legs 2 and 4.

The front wheels 1 and rear wheels 3 include respectively a double caster with a stopper which can be braked by stepping on the stopper; and, the upper portion mounting ends of the front and rear wheels 1 and 3 are respectively inserted into their associated pipe end portions forming the front and rear legs 2 and 4, and are then fixed to them by screws or the like.

The two hand-push frames 5 are respectively formed in a linear shape as a whole and the upper portions of the respective hand-push frames 5 are respectively curved in an inverted-L shape to thereby form right and left horizontal portions 5a; and, in the developed condition thereof, the right and left horizontal portions 5a are respectively connected linearly through their associated joint portions 8 to a centrally disposed connecting portion 9, whereby these portions can be used as a grip portion which can be pushed by hand.

In the folded and stored condition of the hand-push frames 5, the two horizontal portions 5a not only can be rotated in an angle of about 90° with the joint portions 8 as the start points thereof, thereby providing a handle portion which can be held by hand, but also can be slid downward along their associated front legs 2 to thereby reduce their respective height dimensions and thus the height dimension of the stroller.

In addition to the above-mentioned basic frame structure, to the respective lower portions of the two front legs 2, there are connected the two ends of a footrest 10 of a centrally folding type structured such that its central portion can be folded only in the upward direction, and to the respective upper portions of the two front legs 2, there are fixed the two base portions of an armrest and guard circle 11 of a folding type; and, from the upper ends of the vertically extending lower portions of the two hand-push frames 5, there are respectively extended visor support rods 12 in the advancing direction of the stroller in such a manner that they can be folded and developed.

The folding armrest and guard circle 11 of a folding type can be folded and developed. The reason for this is that, as will be discussed later, a guard 11c disposed in the central portion of the guard circle 11 is formed of elastomeric material such as elastic plastics or the like. Of course, if a baby grows and thus there is no need for an annular-shaped mounting portion 11c2 mounted on the guard 11c disposed in the central portion of the guard circle 11, then the mounting portion 11c2 may be removed from an armrest 11b to thereby leave only the armrest 11b in the guard circle 11, so that only the armrest 11b can be used as the folding armrest and guard circle 11.

And, between the two visor support rods 12, there is mounted a sun visor 16 which is formed of flexible material such as cloth or the like. Thus, since the space between the two visor support rods 12 is covered by the flexible material, even if the distance between the two visor support rods 12 is made narrower when the stroller is folded up, there is no fear that the sun visor 16 can interfere with the folding operation of the stroller.

Further, as shown in FIG. 1(*a*), on the front legs 2 and rear legs 4, there are mounted a baby seat 14 formed of cloth and a pouch 15 formed of mesh material, thereby being able to fulfill the requirements for a stroller. By the way, in FIG. 1(*b*), the baby seat 14 and pouch 15 are not shown in order to make the other remaining components of the stroller easy to see.

In the above-mentioned structure, in a state where the stroller is in use as a baby carriage, as shown in FIG. 1(*a*), the first and second open/close links 6 and 7 are respectively spread open in an X shape, thereby securing a sufficient width for the baby to be seated in. In this state, the two hand-push frames 5 are raised up to their respective upper positions, while the horizontal portions 5a of the hand-push frames 5, joint portions 8 and connecting portion 9 are arranged in a linear manner, whereby the stroller can be pushed and moved by hand using the thus linearly arranged portion as a grip thereof while the front wheels 1 and rear wheels 3 are in touch with the ground.

To fold up the stroller from this using state, if a lock releasing mechanism (which will be discussed later) disposed in the connecting portion 9 is operated, then the two hand-push frames 5 can be turned into a state where they can be slid and rotated.

And, while rotating the horizontal portions 5a of the hand-push frames 5 by an angle of approx. 90° with respect to the connecting portion 9, the hand-push frames 5 are slid downward to thereby close the two open/close links 6 and 7, so that, as shown in FIG. 1(*b*), in a state in which the stroller is reduced in the width direction dimension thereof and the front wheels 1 and rear wheels 3 are collected together, the stroller provides a compactly folded shape; and, at the same time, the height dimension of the stroller is shortened by an amount corresponding to the downward sliding of the hand-push frames 5. In this state, the stroller can be locked automatically.

By the way, in the folded state of the stroller, as shown in FIG. 1(*b*) which is a front view of the stroller, the footrest 10 is centrally folded in the upward direction, while the guard circle 11 is inclined backward. Also, the guard (leading end annular-shaped portion) 11c, which is the central portion of the guard circle 11, is formed of elastomeric material such as elastic plastics or the like. However, the guard 11c may also have another folding structure; for example, a core member formed of rigid material and an outer cover formed of elastic material can be assembled together to thereby produce a grip which can be folded up into thirds. That is, if this portion (the guard 11c) is elastically deformed to thereby reduce the width thereof, then the guard circle 11 reduces its width correspondingly to the width reduction of the guard 11c and, at the same time, is automatically inclined backward. Further, if the two visor support rods 12 are folded up, then the sun visor 16 can be turned into its stored condition.

Figure 2:
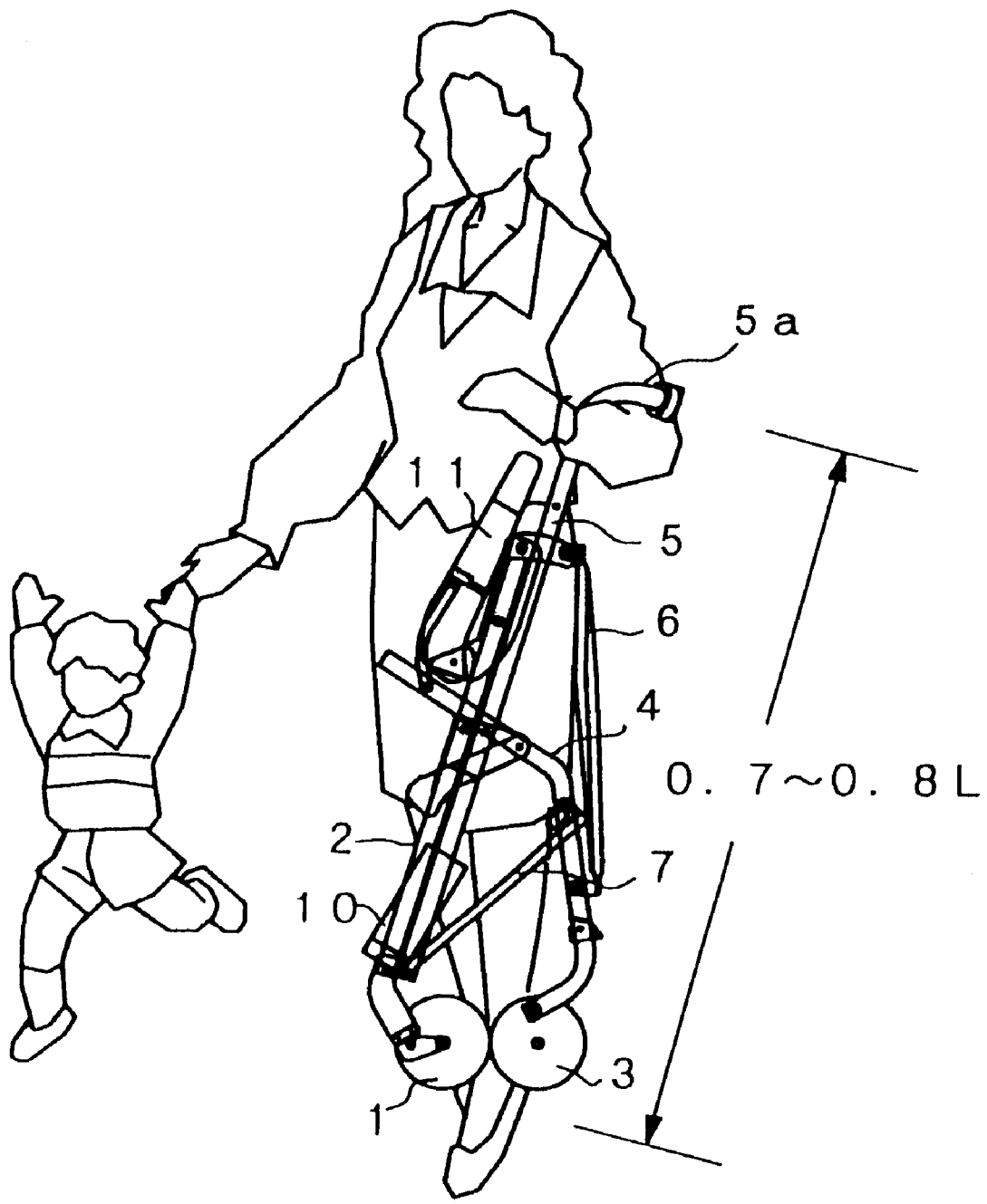
FIG. 2 is an explanatory view of the stroller in the folded state thereof, showing a state in which a user carries the stroller while holding it on her arm.

Accordingly, as shown in FIG. 2, if the dimension of the stroller in the developed state is assumed to be L (FIG. 1(a)), then the dimension thereof in the folded state is reduced down to 0.7–0.8 L. Therefore, when carrying the stroller in the folded state, even when a user carries the stroller while holding the inverted-L-shaped curved horizontal portions 5a of the frames 5 on her or his arm as a carrying handle, so far as the user has an ordinary height as an adult, the user is able to move carrying the stroller with the leading ends of the stroller not in touch with the ground even if the user does not raise her or his arm. Or, even when the user moves the stroller forward by pushing it forward in front of the user while rolling the wheels of the stroller, or even when the user moves the stroller by pulling it forward behind the user while rolling the wheels of the stroller, the user is able to move the stroller easily because the height dimension of the stroller in the folded state is low.

Next, description will be given below of the detailed structures of the front legs 2, rear legs 4 and hand-push frames 5 with reference to FIGS. 3–6.

Figure 6:
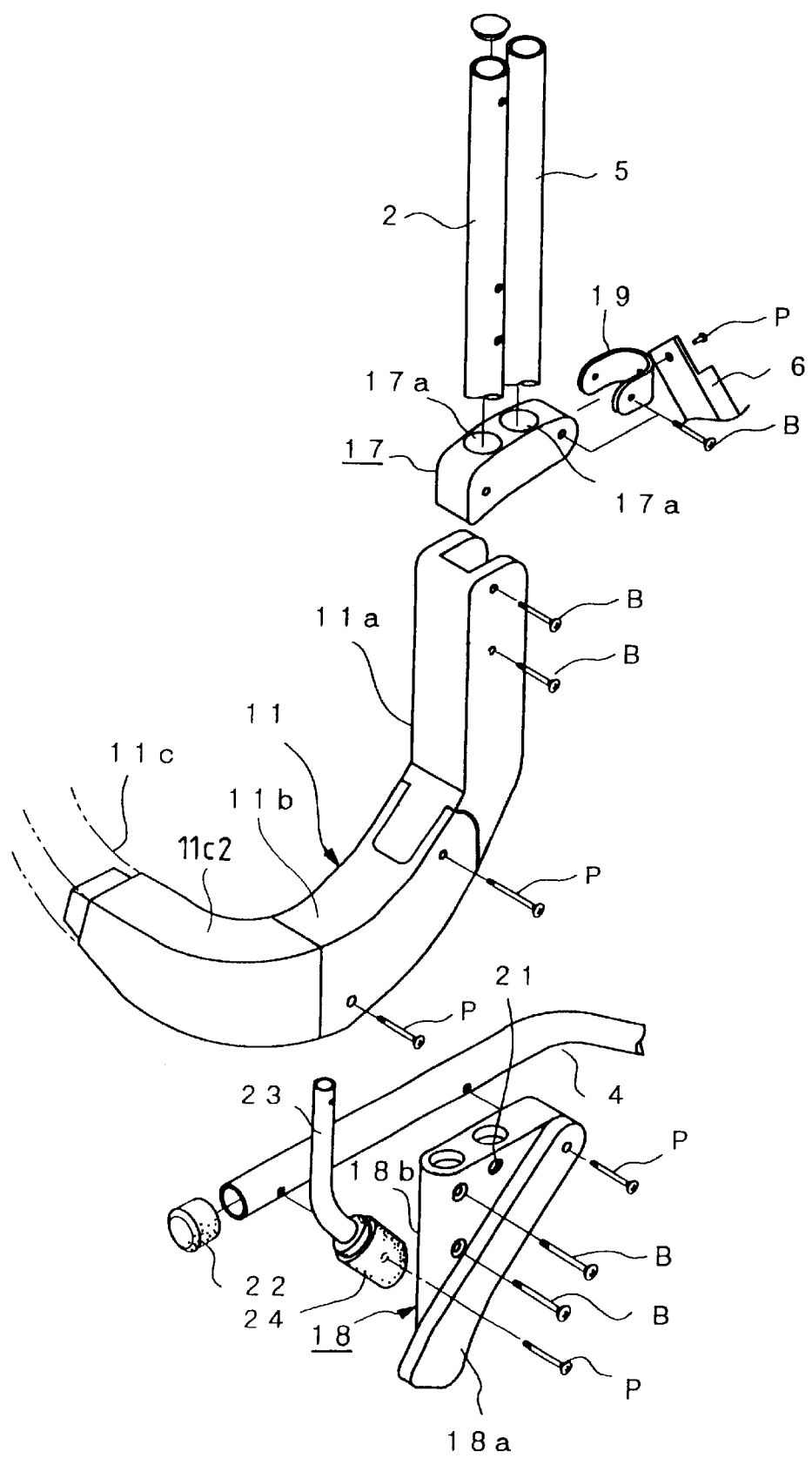
FIG. 6 is an exploded perspective view of the enlarged section of the stroller.

In these figures, to the respective outer peripheries of the upper portion and substantially central portion of each front leg 2, there are respectively fixed an upper holder 17 and a lower holder 18 through screws B (see FIG. 6). Each base portion 11a of the guard circle 11 is fitted with the outer periphery of the upper holder 17, while the base portion 11a and the upper holder 17 are fastened and fixed together to the front leg 2 by screws B respectively in such a manner that the base portion 11a covers the outer periphery of the front leg 2.

In the upper holder 17, there are formed two insertion holes 17a which respectively extend through the upper holder 17 and through which the front leg 2 and hand-push frame 5 can be inserted respectively. Specifically, the upper end of the front leg 2 is inserted through the front side insertion hole 17a and is fixed thereto by the screws B; and, on the other hand, the rear side insertion hole 17a functions as a slide guide for the hand-push frame 5.

In the inner wall 17b of the upper holder 17 in contact with the hand-push frame 5 side, there is formed a lock pin hole 21' (see FIG. 5) through which a lock pin 53 (which will be discussed later) disposed within the hand-push frame 5 can be inserted.

On the rear end of the upper holder 17, there is mounted a U-shaped bracket 19, while one end of the first open/close link 6 is rotatably journaled on the bracket 19 through a fulcrum pin P. Also, the other end of the first open/close link 6 is rotatably journaled through a fulcrum pin P on a bracket 20 (see FIG. 3) which is screwed to the rear leg 4.

The lower holder 18 (see FIG. 6) comprises a side guard 18a formed of synthetic resin and a triangular-shaped holder main body 18b which is disposed inside the side guard 18a integrally therewith, while the triangular-shaped holder main body 18b includes two insertion holes respectively opened up in the upper side surface thereof, so that the front leg 2 and the hand-push frame 5 can be respectively inserted through the two insertion holes of the holder main body 18b; and thus, the front leg 2 can be fixed to the triangular-shaped holder main body 18b by screws B, while the hand-push frame 5 can be slid within the triangular-shaped holder main body 18b.

Accordingly, the holder main body 18b is structured such that not only the lower portion side of the hand-push frame 5 can be fitted with the rear portion side of the front leg 2 in a vertically slidable manner but also the leading end portion side of the rear leg 4 can be rotatably journaled on the rear portion of the holder main body 18b through a fulcrum pin P which extends through the side guard 18a.

By the way, in the holder main body 18b, a hole 21, which is opened up at the insertion position of the hand-push frame 5, is a lock pin hole (which will be discussed later). That is, if the hand-push frame 5 is positioned at its lowered position and raised position using the present lock pin hole 21 and the above-mentioned lock pin hole 21' respectively, then a lock pin 53 (which will be discussed later) is projected, whereby the stroller can be held in two states, namely, in the folded and developed states.

To the leading end of the (cylindrical-shaped) lower end portion of the hand-push frame 5 that projects from the lower holder 18, there is inserted and screwed a shell portion 7a' (see a belched portion of FIG. 5) having a shape like the shell portion of a (Japanese) kokeshi doll. And, there is also disposed a rotary body 7' forming a head portion which cannot be rotated in the axial direction of the shell portion 7a' but can be rotated in the peripheral direction thereof. Also, a projecting portion 7b, is formed integrally with the rotary body 7' in such a manner that it projects in the radial direction of the rotary body 7'. Further, to the leading end of the projecting portion 7b', there is screwed the bottom portion of a U-shaped piece 7c' in such a manner that it can be rotated in the peripheral direction thereof; and, between the two open leading ends of the U-shaped piece 7c', there is connected one end of the second open/close link 7 through a fulcrum pin P.

Thanks to this structure, even if the hand-push frame 5 is slid downward while rotating it by an angle of approx. 90°, the second open/close link 7 can be contracted easily with no trouble.

Also, the rear end of the second open/close link 7 is mounted similarly through a fulcrum pin P on the bracket 20 which is disposed in the substantially central curved portion of the rear leg 4.

The leading end portion of the rear leg 4 projects on the front portion side of the front leg 2, while, a rubber cap 22 for protection is fitted with the projecting end of the leading end portion of the rear leg 4.

And, the projecting end portion side surface of the rear leg 4 is connected through a fulcrum pin P to a pipe-shaped link 23 which is used to incliningly operate the armrest 11b.

The guard circle 11 comprises the above-mentioned two base portions 11a respectively fixed to their associated front legs 2, two armrests 11b respectively inclinably connected to the lower end portions of the two base portions 11a through their associated fulcrum pins P, two leading end annular-shaped mounting portions 11c2 which respectively form part of the guard 11c and are to be fitted with the respective leading ends of the two armrests 11b, the above-mentioned leading end annular-shaped portion (guard) 11c which is formed of the above-mentioned elastomeric material and is to be fitted with the leading ends of the leading end annular-shaped mounting portions 11c2, and the above-mentioned two links 23. And, the respective upper ends of the two links 23 are inclinably connected to the respective insides of the two armrests 11b through their respective fulcrum pins P.

When each guard (leading end annular-shaped portion) 11c is formed of only the elastomeric material, the thickness of the guard 11c is increased to thereby increase the rigidity thereof and, after then, the guard 11c is secured to the leading end annular-shaped mounting portions 11c2 by pins.

Alternatively, a certain member may be inserted into the middle portion of the section of the guard 11c and then the outer cover of the guard 11c may be covered by elastomeric material. Also, as the member to be inserted into the middle portion of the section of the guard 11c, it is also possible to use a wire or a stainless steel plate member; or, a rigid member may be secured to the leading end annular-shaped mounting portions 11c2 by a pin; or, a coiled spring may be secured to the leading end annular-shaped mounting portions 11c2 so that the flexible property of the coiled spring can be used, or, a plate spring may be connected to the leading end annular-shaped mounting portions 11c2.

Of course, when the stroller is used for a baby who has grown in body, the guards 11c can be omitted. That is, in that case, the two leading end annular-shaped mounting portions 11c2 may be respectively removed from their associated armrests 11b and, instead of the leading end annular-shaped mounting portions 11c2, caps or the like may be respectively put on their associated leading ends of the armrests 11b.

Figure 3:
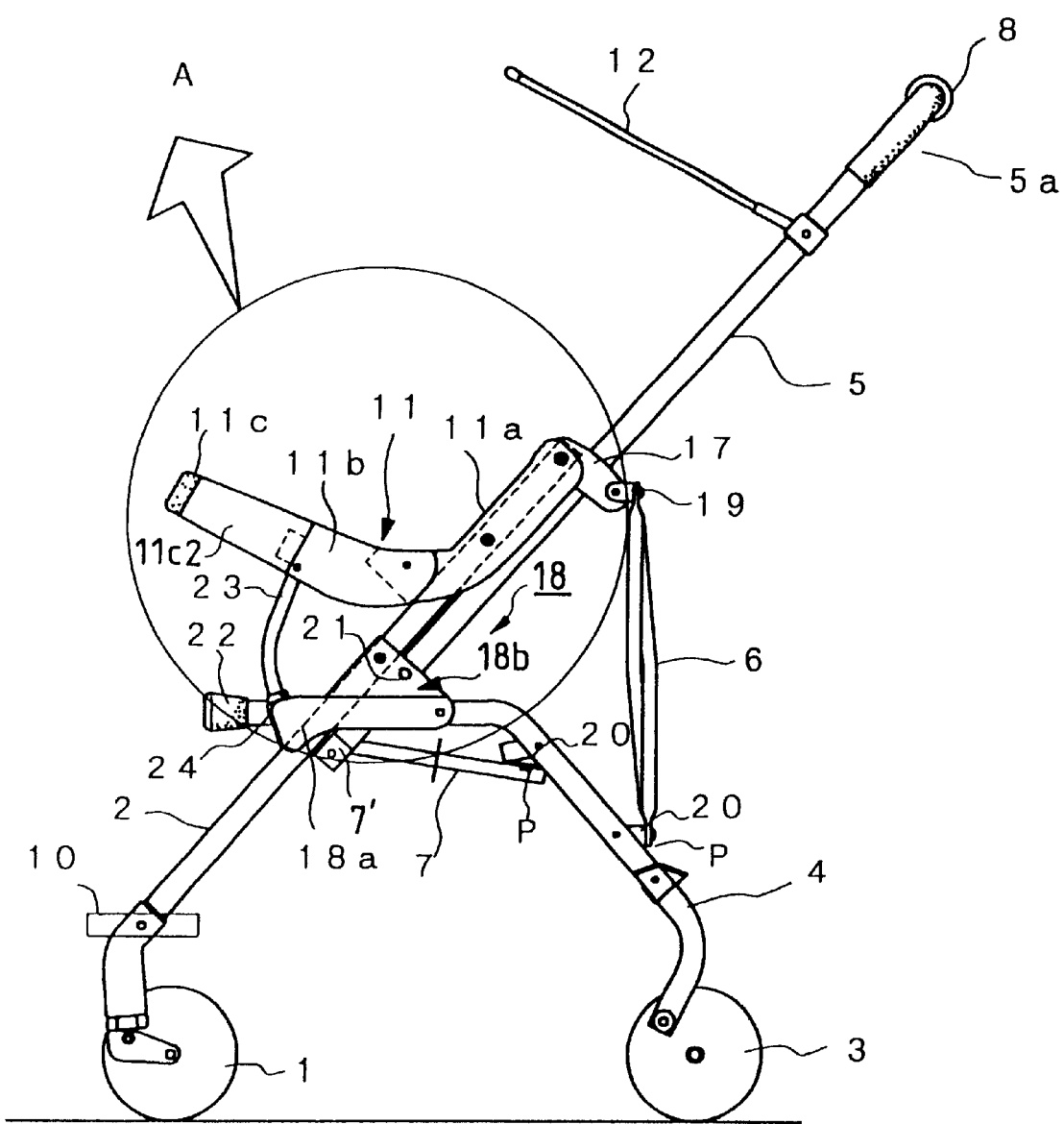
FIG. 3 is a side view of the stroller in the developed state thereof.
Figure 4:
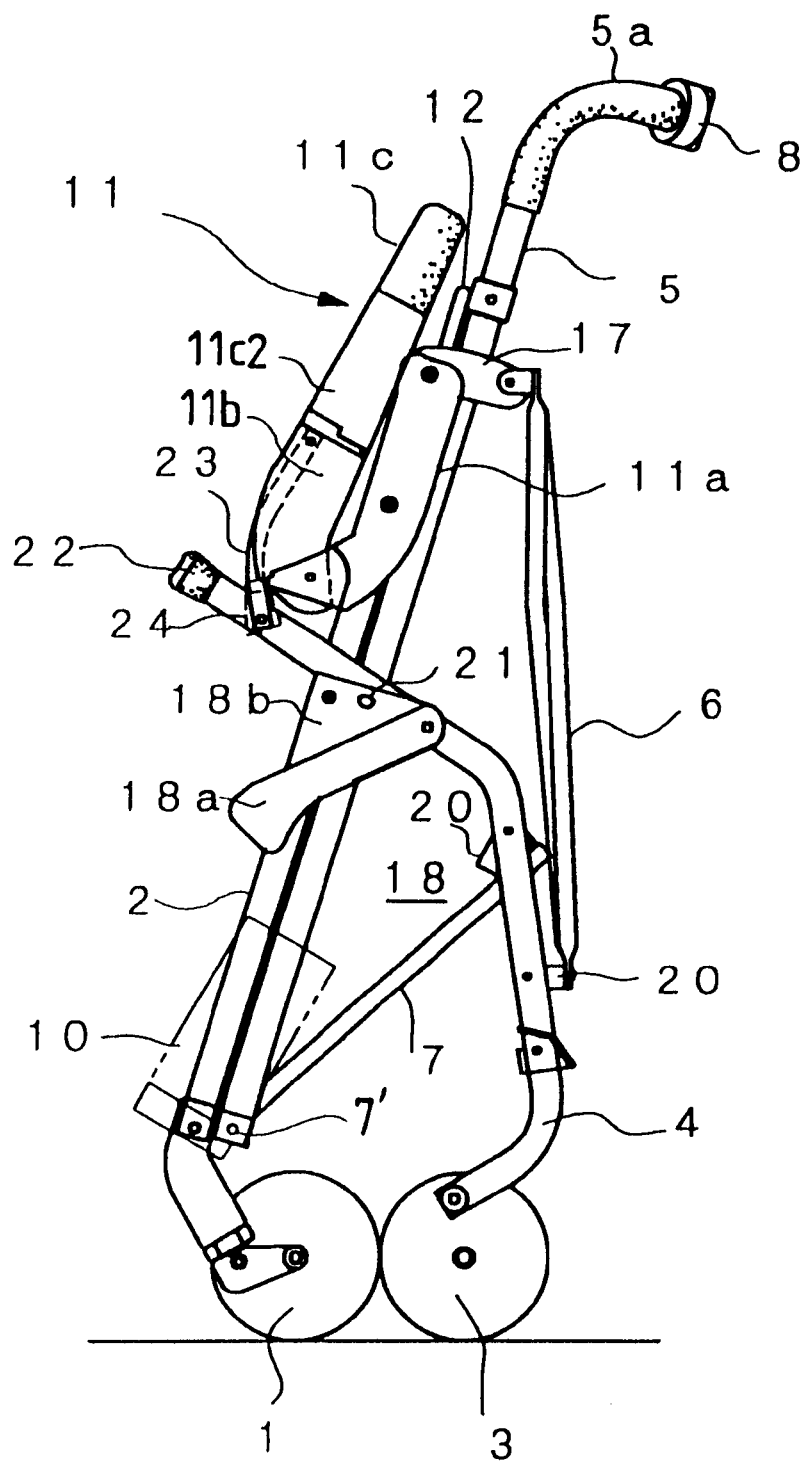
FIG. 4 is a side view of the stroller in the folded state thereof.
Figure 5:
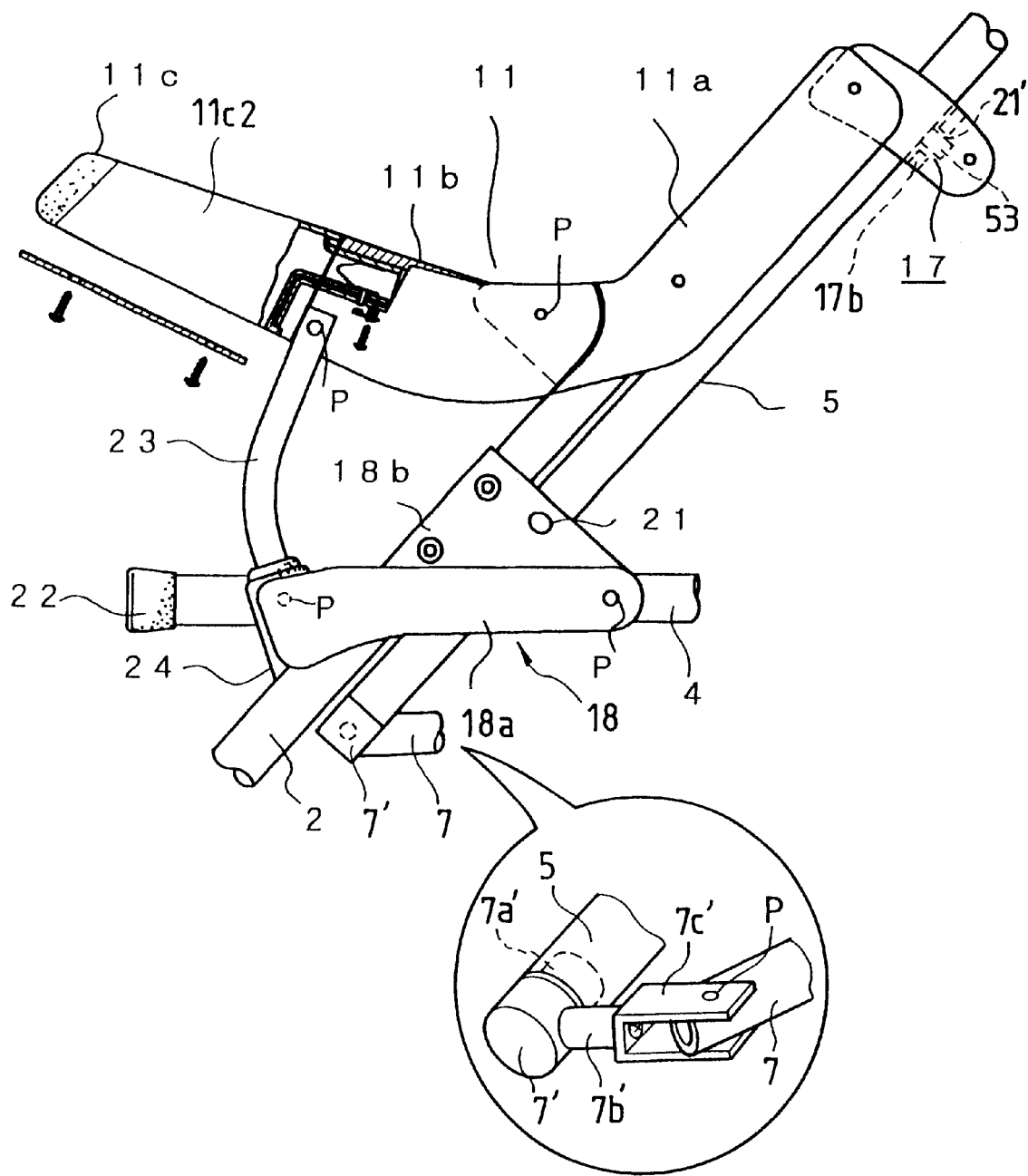
FIG. 5 is an enlarged view of the A portion of the stroller shown in FIG. 3.

A rubber leg 24 is fitted over the lower end outer periphery of each link 23 and, in the developed state thereof shown in FIGS. 3 and 5, the rubber legs 24 are respectively contacted with their associated front legs 2 to thereby support loads which are applied onto the armrests 11b.

Also, in the folded state thereof, since the two links 23 are respectively operated with the rotational movements of the upper ends of the rear legs 4 in the upward direction, the two armrests 11b are respectively inclined backward with their associated fulcrum pins P as the start points thereof and are thereby folded onto the base portions 11a side automatically. That is, in the folding operation of the stroller, with no need to raise the armrests 11b by hand, the armrests 11b can be folded automatically. Thanks to this, the folded dimension of the stroller in the longitudinal direction thereof can be made more compact.

By the way, in the foregoing description, although the designations B and P are given uniformly to the screws and pins, of course, they can be different in diameter and length according to the shapes of mounting holes into which they can be inserted and, especially, the screws B can be replaced by other fixing means such as rivets or the like depending on their mounting positions.

Next, description will be given below of a locking mechanism and a lock releasing mechanism to be used in developing and folding the above-structured stroller with reference to FIGS. 7 to 10. By the way, FIGS. 7 to 9 respectively show the upper portion of each of the hand-push frames and its operation mechanism, while FIG. 10 shows a lock pin projecting and retreating mechanism which can be operated in linking with the operation mechanism.

At first, in FIG. 7, over the horizontal portion 5a of each of the two hand-push frames 5, there is fitted a holder grip 30 formed of elastomeric material in such a manner that it is extended up to the upper portion of the vertical portion of each hand-push frame 5.

Also, the outer periphery of each of the joint portions 8 is also covered with a cover 31 formed of elastomeric material. By the way, the structure of the joint portion 8 is the same or similar to the structure of a conventionally known stroller and thus the description thereof is omitted here.

Referring to the structure of the connecting portion 9, in the inside of a housing 32 which is formed of synthetic resin in a shape easy to hold, there is incorporated an operation mechanism for locking the connection portion 9 and removing such locking, there is disposed on the upper portion of the housing 32 a lock lever 34 which can be slid in the right and left directions, and, substantially on the central portion of the lower portion of the housing 32, there is projectingly provided a lock releasing lever 35 of a trigger type.

Now, description will be given below in more detail of the above-mentioned connecting portion 9.

Figure 8:
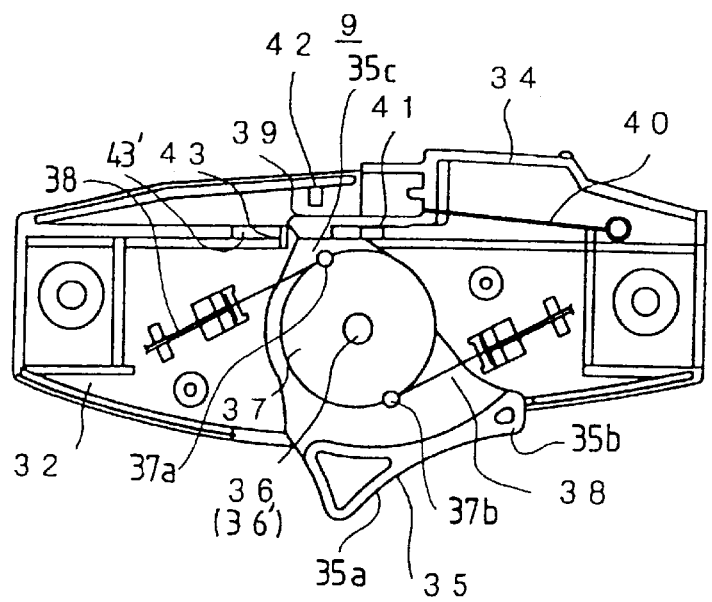
FIG. 8 is a frontal section view of an operation mechanism provided in the inside of a connecting portion employed in the above hand-push frame upper portion.
Figure 9A:
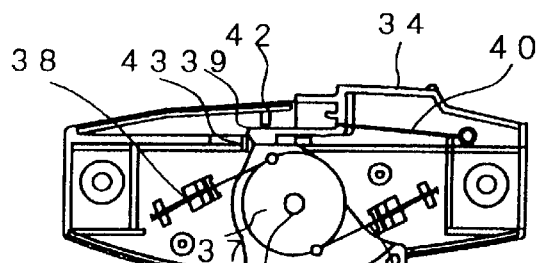
FIG. 9(a) shows the locked state thereof.
Figure 9B:
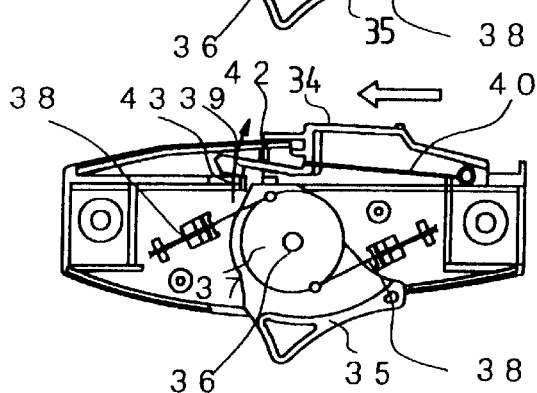
FIG. 9(b) shows a state thereof in which a lock lever 34 is slid to an lock-off position against the spring pressure of a spring.
Figure 9C:
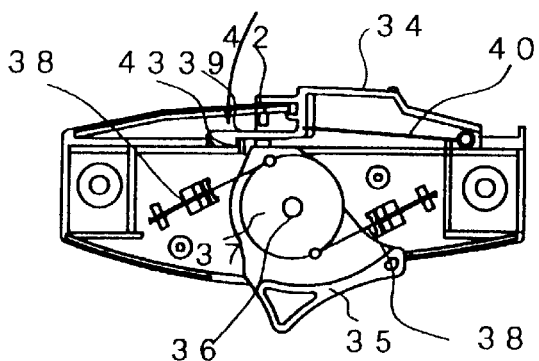
FIG. 9(c) shows a state thereof in which the trigger operation of a lock releasing lever 35 is possible.
Figure 9D:
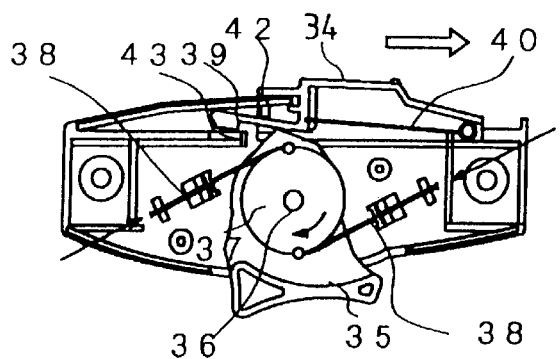
FIG. 9(d) shows a state thereof in which a securing pawl 39 is removed from the engagement with an extension portion 43.

In the connecting portion 9, as shown in FIGS. 8 and 9, there is disposed the housing 32; and, the housing 32 includes a space which is formed by screwing together two plastic moldings and within which a certain member can be stored. In the central portion of the thus formed inner space, there is disposed a support shaft 36 which is formed integrally with the housing 32 and, into the support shaft 36, there is rotatably fitted a central hole 36' formed in the lock releasing lever 35. The lock releasing lever 35 is structured such that its pressing portions 35a and 35b are respectively exposed to the outside from an opening formed in the housing 32; and thus, a user is allowed to press against the pressing portion 35a or 35b from the outside of the housing 32. Also, in the lock releasing lever 35, on the opposite side to the pressing portions 35a and 35b with the central hole 36' as the center thereof, there is formed an operation portion 35c which executes an operation to press against a securing pawl 39 (which will be discussed later). Further, the lock releasing lever 35 includes a disk 37 which is formed integrally therewith and concentrically with the central hole 36'; and, at a plurality of positions (in FIG. 8, at two positions) of the circumference of the disk 37, there are disposed release wire securing portions 37a, 37b. When the respective one-end portions of release wires 38 are secured to their associated release wire securing portions 37a, 37b, that is, in a state shown in FIG. 8, if the pressing portion 35a of the lock releasing lever 35 is pressed clockwise against the support shaft 36 to thereby rotate the lock releasing lever 35 clockwise, then the release wire securing portions 37a and 37b respectively pull their associated release wires 38.

Figure 7A:
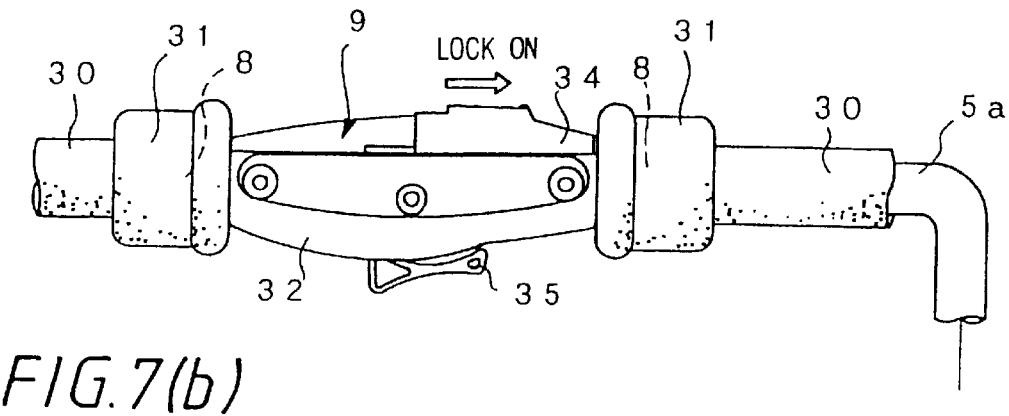
FIG. 7(a) shows the position relations among the respective components of the hand-push frame upper portion in the locked state thereof.
Figure 7B:
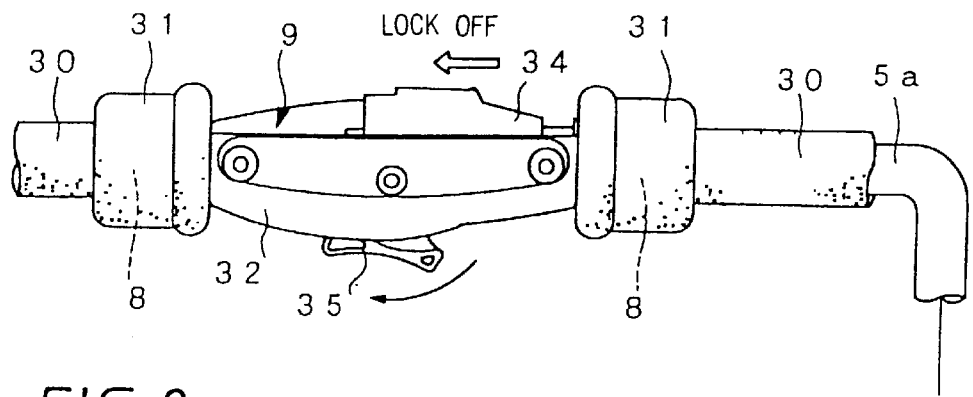
FIG. 7(b) shows the position relations among the respective components of the hand-push frame upper portion in the unlocked state thereof.

As described above, the lock lever 34, which is formed by injection molding of the same synthetic resin material as the housing 32, is fitted with the housing 32 in such a manner that the lock lever 34 can be slid in the right and left directions in FIG. 7. Specifically, FIG. 7(a) shows a state in which the lock lever 34 is situated at the right-most side position on the housing 32 and, at this position, the lock releasing lever 35 is held in its locked state (LOCK ON) where it is prevented against rotation. On the other hand, FIG. 7(b) shows a state in which the lock lever 34 is moved on the housing 32 slightly to the left from the position shown in FIG. 7(a). At this position, the lock releasing lever 35 can be rotated and, therefore, the lock releasing lever 35 is held in its lock-removed state (LOCK OFF).

Here, description will be given below of the structures of the lock lever 34 and its associated parts. In the lock lever 34, there is disposed a securing pawl 39 at the leading end of the lock lever 34 in the sliding direction thereof which is located beyond a thin intermediate portion 41 of the lock lever 34. Referring to the shape of the securing pawl 39, the thickness thereof in the perpendicular direction to the sliding direction of the lock lever 34 is considerably larger than the thickness of the intermediate portion 41 (in FIG. 8, about double). Also, the lock lever 34 is normally energized by a tensile spring 40 to the lock position side shown in FIG. 7(a).

On the other hand, on the housing 32 side, in particular, on the opposite side thereof to the lock releasing lever 35, there is formed a securing stepped portion 42 in such a manner that it has a large thickness and faces the large-thickness portion of the lock lever 34, that is, the securing pawl 39 of the lock lever 34; in the sliding-direction (in FIG. 8, the right-and-left direction) extension line of the lock lever 34 large-thickness portion or the securing pawl 39, there is extended an extension portion 43 which starts from the opposite direction of the housing 32 and reaches near the securing pawl 39; and, in the vicinity of the leading end of the extension portion 43, there is formed an engaging groove 43' into which the securing pawl 39 can be engaged.

However, the intermediate portion 41 and the securing pawl 39 may not be formed integrally with the lock lever 34 as in the mentioned structure but, for example, a plate spring made of steel, or a molding formed of polyamide resin, polyacetal resin or the like which is referred to as engineering plastics may also be mounted on the leading end of the lock lever 34. In this case, the elastic forces of the intermediate portion 41 and the securing pawl 39 can be selected freely, which in turn makes it possible to eliminate the need for provision of the securing stepped portion 42.

Next, description will be given below of the operation procedures for the lock lever 34 and lock releasing lever 35 with reference to FIGS. 9(*a*)–(*d*).

FIG. 9(*a*), similarly to FIG. 8, shows the locked state of the connecting portion 9.

That is, the lock lever 34 is held at the locked position (FIG. 7(*a*)), and the lock releasing lever 35 is held in the state shown in FIG. 8. Therefore, the pressing portion 35*a* of the lock releasing lever 35 is not pressed clockwise but the release wires 38 are respectively held in their extended conditions. Here, even if the user tries to suddenly press against the pressing portion 35*a* of the lock releasing lever 35 clockwise, since there is present no movable space between the large-thickness securing pawl 39 and securing stepped portion 42, the operation portion 35*c* of the lock releasing lever 35 is prevented against rotation, so that it is impossible to press and rotate the pressing portion 35*a* clockwise. Therefore, the release wires 38 are held in such a state where they cannot be pulled.

Next, if the lock lever 34 is slid toward its lock-off position.(FIG. 7(*b*)) against the spring pressure of the spring 40 from the state shown in FIG. 9(*a*) to a state shown in FIG. 9(*b*), then the leading end of the securing pawl 39 is contacted with the extension portion 43 and is caused to run up onto the same.

And, if the lock lever 34 is further slid toward its lock-off position (FIG. 7(*b*)) against the spring pressure of the spring 40, then the securing pawl 39 is caused to run up onto the extension portion 43 and, after then, as shown in FIG. 9(*c*), it is engaged into the engaging groove 43' which is formed in the vicinity of the leading end of the extension portion 43. In this state, the portion that faces the operation portion 35*c* is not the large-thickness securing pawl 39 any longer but is the small-thickness intermediate portion 41 of the lock lever 34 and, therefore, there is provided a sufficient movable space between the operation portion 35*c* of the lock releasing lever 35 and the intermediate portion 41 of the lock lever 34 and thus it is possible to press and rotate the pressing portion 35*a* clockwise. Accordingly, if the pressing portion 35*a* is pressed and rotated clockwise, then the disk 37 formed integrally with the pressing portion 35*a* can be rotated and the right and left release wires 38 can be thereby pulled.

Further, as the pressing portion 35*a* of the lock releasing lever 35 is pressed and rotated clockwise, the operation portion 35*c* of the lock releasing lever 35 is shortly contacted with the intermediate portion 41; and, due to further pressing of the pressing portion 35*a* clockwise, as shown in FIG. 9(*d*), the operation portion 35*c* raises the intermediate portion 41 and thus the securing pawl 39 formed integrally with the intermediate portion 41 is raised up from the engaging groove 43'. And, if the securing pawl 39 is raised higher above the extension portion 43, then the lock lever 34 is pulled back immediately in the direction of an arrow line shown in FIG. 9(*d*) due to the spring pressure of the spring 40 so that the securing pawl 39 exceeds the extension portion 43. However, in this state, the operation portion 35*c* still prevents the return of the securing pawl 39 and, therefore, the securing pawl 39 is not be able to return completely to the position shown in FIG. 9(*a*).

And, after the right and left release wires 38 are pulled completely, in a stage in which the right and left release wires 38 are loosened next, at the time when the pressing portion 35*b* of the lock releasing lever 35 is pressed and thus the lock releasing lever 35 is rotated counterclockwise to thereby move back the operation portion 35*c* of the lock releasing lever 35, the securing pawl 39 is able to return to the position shown in FIG. 9(*a*).

However, when the force to loosen the two release wires 38 is strong, since the lock releasing lever 35 can be rotated counterclockwise even if the pressing portion 35*b* thereof is not pressed, the securing pawl 39 is able to return to the position shown in FIG. 9(*a*) even if the pressing portion 35*b* is not pressed.

Now, FIG. 10 shows a projecting and retreating mechanism for projecting and retreating a lock pin 53, which is disposed within each of the two hand-push frames 5, in linking with the release wire pulling and loosening operations, which have been described with reference to FIG. 8, that is, the operation to pull the right and left release wires 38 due to the clockwise rotation of the lock releasing lever 35 as well as the operation to loosen the right and left release wires 38 due to the counterclockwise rotation of the lock releasing lever 35.

The present lock pin projecting and retreating mechanism is a mechanism which, by pulling the hand-push frame 5 upward and rotating it by an angle of approx. 90°, projects the lock pin 53 disposed within the lock pin projecting and retreating mechanism and thus inserts it into the lock hole 21' (see FIG. 5) formed in the upper holder 17 to thereby fix the stroller to the developed state (see FIG. 1(*a*)), or, by contracting the hand-push frame 5 downward and rotating it by an angle of approx. 90°, projects the lock pin 53 disposed within the lock pin projecting and retreating mechanism and thus inserts it into the lock hole 21 (see FIG. 5) formed in the lower holder 18 to thereby fix the stroller to the folded state (see FIG. 1(*b*)).

From now on, in FIG. 10, description will be given below of a case in which the lock pin projecting and retreating mechanism is moving to the position of the lower holder 18 held in the folded state. However, the operation itself is completely the same as in a case in which the lock pin projecting and retreating mechanism is moving to the position of the upper holder 18 held in the developed state, except that the position of the lock hole 21' is a position which is rotated by an angle of approx. 90° when compared with the lock hole 21.

Referring again to FIG. 10, this figure is a section view of the lock pin projecting and retreating mechanism disposed in the vicinity of the central portion of the vertical portion of the lower portion of the hand-push frame, showing the operations of the present mechanism; and, in particular, FIG. 10(*a*) shows the operation thereof in locking the lock pin 53, and FIG. 10(*b*) shows the operation thereof in unlocking or in removing the locked condition of the lock pin 53 respectively.

In FIG. 10, the lock pin projecting and retreating mechanism comprises a fixed block 50 which has a shape obtained by dividing a cylindrical block corresponding to the inside diameter of the hand-push frame 5 into two sections and is fixed to the inside of the hand-push frame 5, a slide block 51 which can be slid along the hand-push frame 5 and the lowered position of which is restricted by a stepped portion 50a formed on the lower portion side of the fixed block 50, and a lock pin 53 projectable into and retreatable from a hole 52 which is formed in the hand-push frame 5 in such a manner that it extends at right angles to the sliding direction of the slide block 51.

In the respective upper portions of the two blocks 50 and 51, there are formed two-split-shaped holes 50b and 51a, the other end portion of the release wire 38 is connected to the hole bottom of the slide block 51, a compression coil spring 54 is inserted into the holes 50b and 51a, and the slide block 51 is normally pulled toward the stepped portion 50a of the fixed block 50 due to the spring pressure of the compression coil spring 54.

The lock pin 53 includes a pin leading end portion 53a and a flange 53c including an inclined slide surface 53b formed in the rear of the pin leading end portion 53a; and, the lock pin 53 is normally energized in its projecting direction from the hole 52 because the rear portion of the flange 53c of the lock pin 53 is pressed by a spring 55 inserted into a hole 50c which is so opened up in the fixed block 50 as to intersect at right angles to the longitudinal direction of the hand-push frame 5.

On the other hand, on the lower portion side of the slide block 51, there is opened up an elongated hole 51b which allows the leading end portion 53a of the lock pin 53 to project by an amount equivalent to the moving stroke of the slide block 51 and, at the same time, on the back surface side of the slide block 51, there is formed a projection-guiding inclined surface 51c which can be engaged with the slide surface 53b of the lock pin 53.

In the above-mentioned structure, in a state in which the release wire 38 is not pulled, as shown in FIG. 10(a), the slide block 51 is in touch with the stepped portion 50a of the fixed block 50 due to the pressure of the compression coil spring 54 and the inclined surface 51c is held at its lowered position, with the result that the leading end portion 53a of the lock pin 53 is projected outwardly of the hole 52 and is further projected into either the lock hole 21' formed in the upper holder 17 or the lock hole 21 formed in the lower holder 18. This restricts the vertical movement of the hand-push frame 5. In a state in which the lock pin 53 is projected into and engaged with the lock hole 21', the hand-push frame 5 is situated at its raised position and, therefore, the stroller is held or locked in the developed state. On the other hand, in a state in which the lock pin 53 is projected into and engaged with the lock hole 21, the hand-push frame 5 is situated at its lowered position and, therefore, the stroller is held or locked in the folded state.

By means of the above-mentioned trigger operation, if the release wire 38 is pulled upward as shown by an arrow mark (1) in FIG. 10(b), then the slide block 51 is raised up against the spring pressure of the compression coil spring 54, with the result that the leading end portion 53a of the lock pin 53 is retreated along the inclined surface 51c as shown by an arrow mark (2) in FIG. 10 (b) to disappear into the hand-push frame 5.

In this state, the sliding operation of the hand-push frame 5 itself is possible as shown by an arrow mark (3) in FIG. 10(b). At the then time, even if the trigger operation is stopped, the leading end portion 53a of the lock pin 53 can be only contacted with the inner peripheral wall of the lower holder 18.

As can be seen from the above, in the folded position, the lock pin 53 acts on the lock pin hole 21 formed in the lower holder 18 and, in the developed position, the lock pin 53 similarly acts on the lock pin hole 21' formed in the upper holder 17.

In the above-mentioned manner, if the lock pin 53 is engaged with either the lock pin hole 21' formed in the upper holder 17 or the lock pin hole 21 formed in the lower holder 18 due to the upward or downward sliding operation as well as the rotating operation, then the lock pin 53 is automatically projected due to the spring pressure of the compression coil spring 55 and is fixed to the position of the lock pin hole. Therefore, if the lock releasing operation is carried out once, when the stroller is turned from the developed position to the folded position or vice versa, the stroller can be automatically locked in either of the folded or developed state.

Next, description will be given below of a locking and unlocking mechanism for locking and unlocking the footrest of a centrally folding type with reference to FIGS. 11–13.

Figure 11:
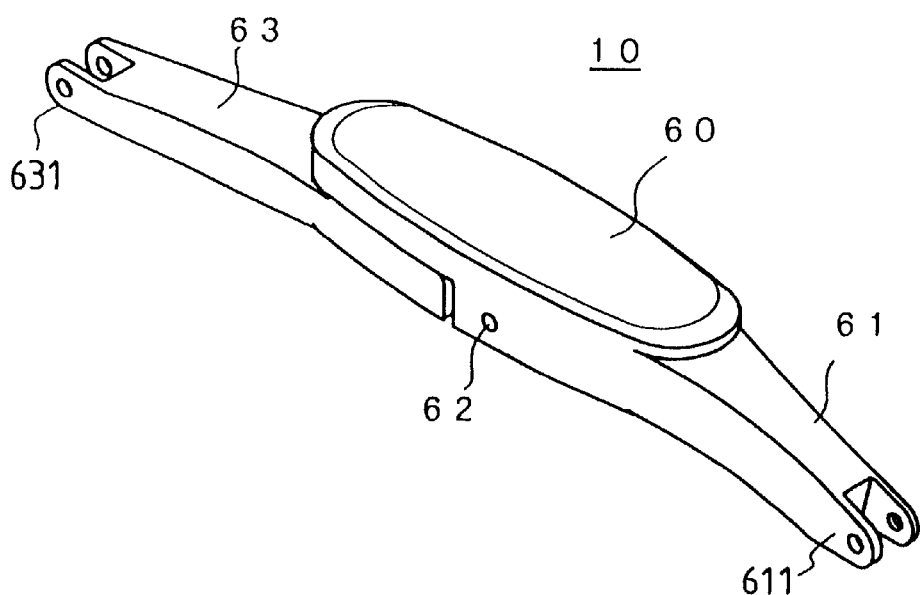
FIG. 11 is a perspective view of a footrest of a centrally folding type.

At first, in FIG. 11, there is shown the outside of the footrest 10. The footrest 10, which is formed of synthetic resin, aluminum die casting, or the like, comprises a substantially rectangular-shaped step plate 60, one support arm 61 which is formed integrally with the lower portion of one end of the step plate 60 and is extended therefrom, the other support arm 63 which is disposed on the other end side of the step plate 60 and can be folded only in the upward direction through a fulcrum pin 62 provided on the lower surface of the substantially central portion of the step plate 60, and two brackets 611 and 631 which are respectively formed integrally with the respective end portions of the two support arms 61 and 63 and are to be fixed to the respective outer periphery of the two front legs 2.

Figure 12:
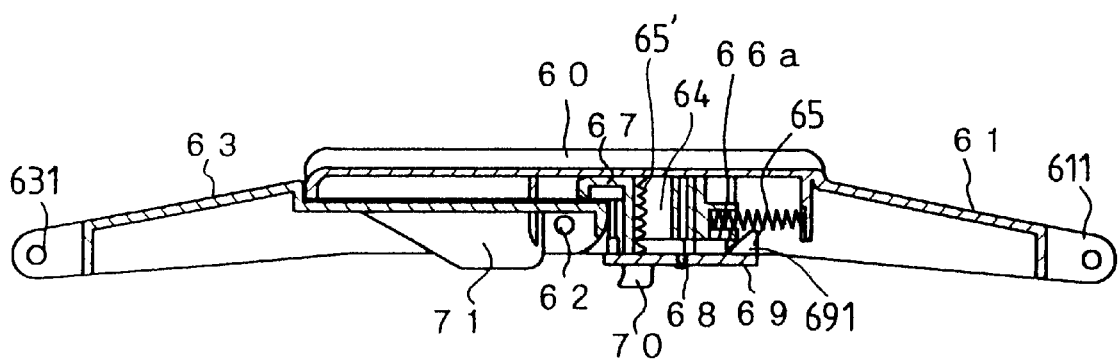
FIG. 12 is a frontal section view of a locking mechanism for locking the footrest.

Also, the inside of the footrest 10, as shown in FIG. 12, comprises a moving block 64 which is disposed on one support arm 61 side and is energized by a compression coil spring 65 in a direction where it approaches the other support arm 63 side, a securing pawl 67 which is provided on and projected from the other end side of the moving block 64 and can be moved to the upper surface of the other support arm 63 to thereby lock the other support arm 63 in a horizontal condition, a swing plate 69 which is swingably supported through a pin 68 on the lower surface side of the moving block 64, a lock releasing knob 70 which is provided integrally on and projected from one end of the lower surface of the swing plate 69, and a locking pawl 691 which is provided on and projected from the upper portion of the other end of the swing plate 69 and can be contacted with the other end face of the moving block 64 to thereby restrict the movement of the moving block 64.

Also, on the securing pawl 67 side of the moving block 64, there is interposed a second compression coil spring 65' between the support arm 61 and swing plate 69 and, therefore, there is normally applied a force which separates the support arm 61 and swing plate 69 from each other.

On the end portion side of the moving block 64, there is formed an engaging recessed portion 64a capable of receiving the locking pawl 691 therein.

Further, on the lower surface of the support arm 63, there is projectingly provided a contact block 71 which can be contacted with the swing plate 69 to thereby swing the swing plate 69.

Figure 13A:
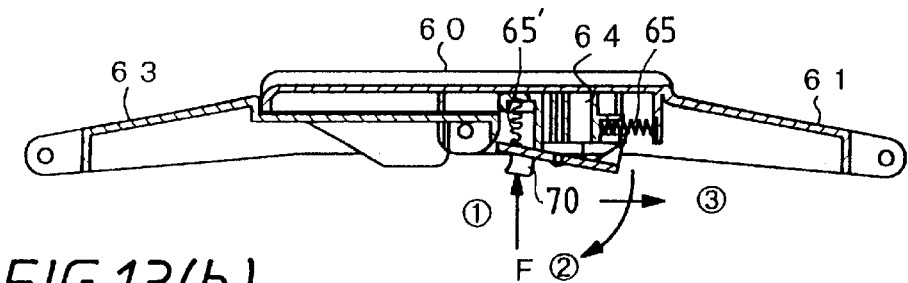
FIGS. 13(a)–(d) are respectively explanatory views of the operation order of the above locking mechanism.
Figure 13B:
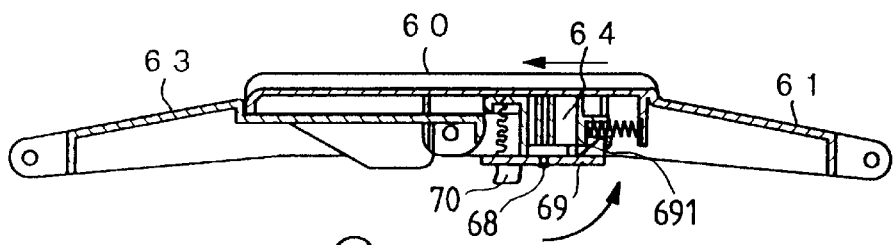

In the developed state of the footrest 10 shown in FIGS. 11 and 12, as shown by an arrow line (1) in FIG. 13(a), if an external force F is applied to the lock releasing knob 70, then the swing plate 69 is swung in an arrow line (2) direction in FIG. 13(a). As a result, the locking pawl 691 is removed and thus the moving block 64 is moved in an arrow line (3) direction in FIG. 13(a) against the energizing force of the compression coil spring 65 due to the pressing force of the swing plate 69, whereby the securing pawl 67 is removed and thus the support arm 63 can be rotated. By the way, this operation is carried out by pressing down the lock releasing knob 70 by hand. Since the securing pawl 67 is removed and thus the support arm 63 can be rotated, if the support arm 63 is slightly rotated counterclockwise, then the moving block 64 is now prevented from moving to the left and thus, if the hand is released from the lock releasing knob 70, then the swing plate 69 is energized from the inside thereof due to the energizing force of the second compression coil spring 65' and thus the locking pawl 691 of the swing plate 69, as shown in FIG. 13(b), is moved into the engaging recessed portion 64a (see FIG. 12), thereby being able to maintain the unlocked or lock-removed condition.

Figure 13C:
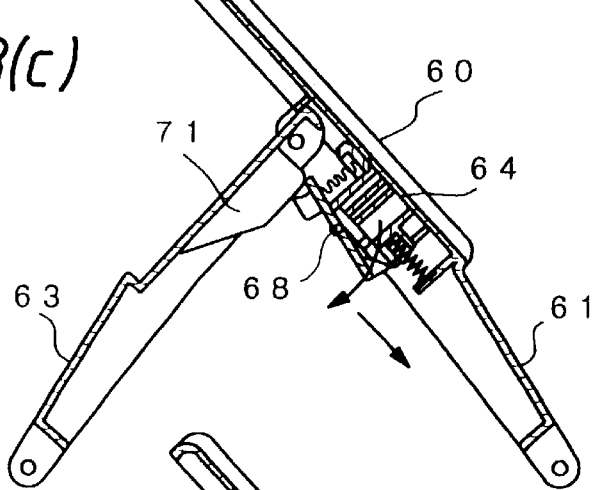

Next, if the footrest 10 is centrally folded up to a certain angle due to the folding operation, then the contact block 71, as shown in FIG. 13(c), is contacted with the swing plate 69 to thereby swing the swing plate 69 clockwise, so that the swing plate 69 is separated from the moving block 64.

Figure 13D:
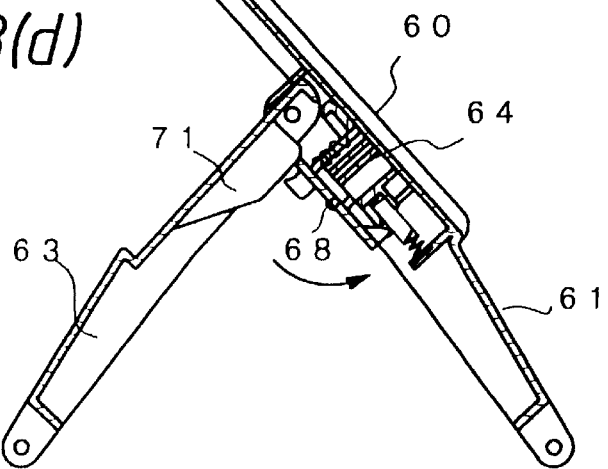

Also, as shown in FIG. 13(d), at the above-mentioned angle, the swing plate 69 is energized from the inside thereof due to the energizing force of the second compression coil spring 65' and is thereby returned back to its horizontal position. During this, the moving block 64 is moved forward due to the spring pressure and the leading end of the securing pawl 67 of the moving block 64 is thereby collided with the rotation arc surface of the support arm 63.

Accordingly, if an operation to return the footrest back to the horizontal position is executed from this state, then the footrest can be returned to the horizontal side thereof while it remains in the lock-removed state, that is, in the unlocked state; and, if the footrest is turned into the horizontal state, then the moving block 64 is moved forward again due to the spring pressure and the securing pawl 67 of the moving block 64 is thereby moved again onto the support arm 63, so that, as shown in FIG. 12, the footrest can be locked again.

Therefore, in operation, a user may only have to remove the locked condition of the footrest once by hand in folding the footrest, and there is no need for the user to lock the footrest again by hand in developing the footrest.

However, the above-mentioned footrest 10, when folding the same, requires an operation to remove the locked condition thereof once by hand. To carry out this operation, in fact, the user must move in front of the stroller from behind, crouch down and press against the lock releasing knob 70 by hand: that is, this operation is rather troublesome to carry out.

Thus, it has been desired to remove the locking of the footrest 10 and lock the same perfectly automatically. Now, FIGS. 14 to 17 show the realization of such perfectly automatic lock releasing and locking of the footrest 10.

Next, description will be given below of a second embodiment of the footrest 10 in which the lock releasing and locking of the footrest 10 can be executed perfectly automatically with reference to FIGS. 14 to 17. By the way, in these figures, the illustration of parts thereof identical with or similar to those employed in the above-mentioned first embodiment is omitted here or the same designations are given to them, whereas only new matters of the present embodiment will be described using another designations.

In FIGS. 14–17, in the inside of the footrest 10 where the step plate 60 is disposed, there is arranged a slide block 80 which is structured such that a leading end securing pawl 80a thereof is positioned at the upper portion of the rotation end of the other support arm 63 by a compression coil spring 81. Also, the slide block 80 is connected to one end of a release wire 82.

The other end of the release wire 82 is drawn out along the front leg 2 and is connected to a cam 83 (which will be discussed later) which is mounted on the front leg 2 on the lower portion side of the lower holder 18.

The illustration of the remaining portions of the structure of the second embodiment is omitted but they are the same as those shown in FIG. 12 and the functions thereof are also the same as those shown in FIG. 12. That is, they include a swing plate swingably supported on the lower surface side of the slide block 80 through a pin, a lock releasing knob provided integrally on and projected from one end of the lower surface of the swing plate, and a locking pawl which is provided on and projected from the upper portion of the other end of the swing plate can be contacted with the other end face of the slide block 80 to thereby restrict the movement of the slide block 80.

Also, on the securing pawl 80a side of the slide block 80, between the support arm 61 and swing plate 69, there is interposed a second compression coil spring which normally applies a force to separate the support arm 61 and swing plate 69 from each other. On the end portion side of the slide block 80, there is formed an engaging recessed portion which is capable of receiving the locking pawl therein.

Further, on the lower surface of the support arm 63, there is projectingly provided a contact block which can be contacted with the swing plate 69 to thereby swing the swing plate 69.

On the other hand, the cam lead surface of the cam 83 can be engaged with a cam floor pin 84 which is provided on and projected from the lower end of the hand-push frame 5 and thus it can be rotated as the cam floor pin 84 moves up and down.

Figure 14:
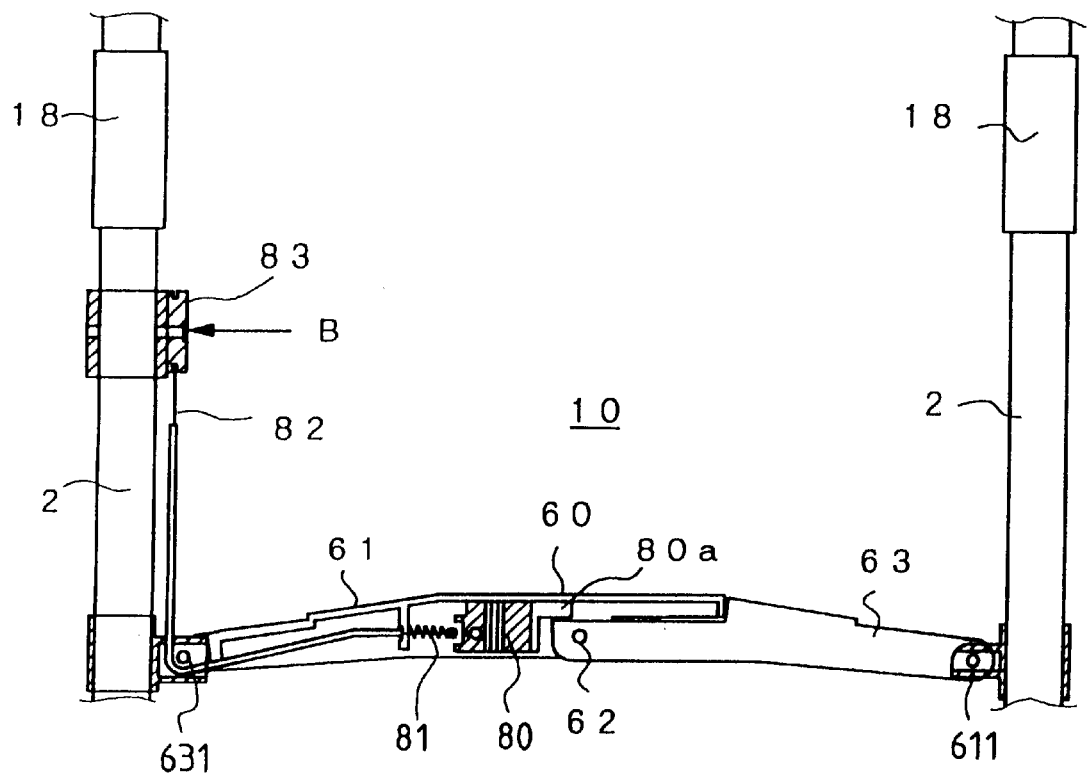
FIG. 14 is a frontal section view of a second embodiment of a locking mechanism and a lock releasing mechanism for the footrest of a centrally folding type.
Figure 15:
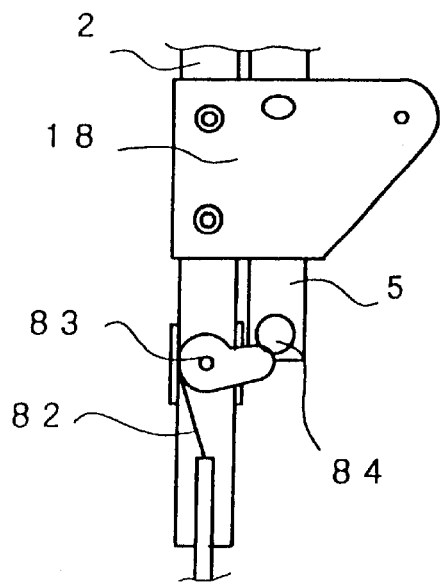
FIG. 15 is a partially enlarged view of the second embodiment, taken along the arrow B shown in FIG. 14.

In the developed state of the stroller, that is, as shown in FIGS. 14 and 15, in the raised state of the hand-push frame 5, the cam lead portion of the cam 83 is rotated upward and the release wire 82 is thereby loosened, with the result that slide block 80 is moved to the other support arm 63 side to bring the securing pawl 80a thereof into engagement with the upper portion of the rotation end of the other support arm 63, thereby locking the centrally folded state of the footrest 10.

Figure 16:
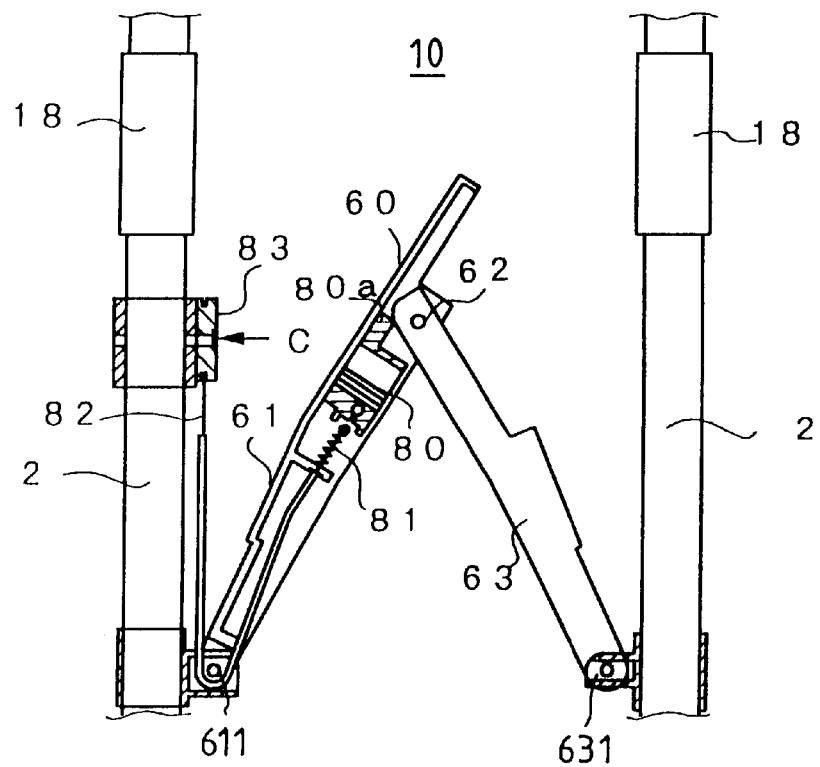
FIG. 16 is a frontal section view of the footrest, showing its centrally folded state; and, FIG. 17 is a partially enlarged view of the footrest, taken along the arrow C shown in FIG. 16.
Figure 17:
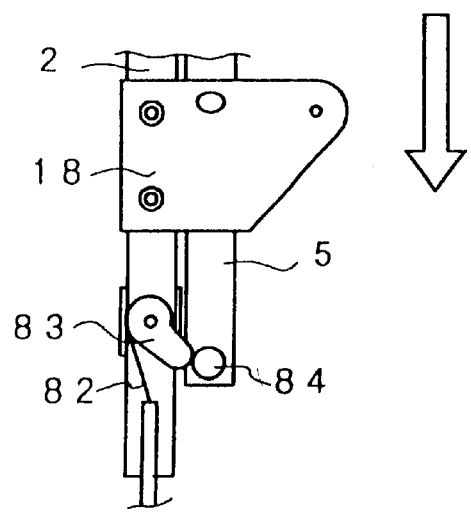

From this state, if the hand-push frame 5 is lowered by means of the folding operation, then the cam floor of the cam 83, as shown in FIGS. 16 and 17, is rotated downward to thereby pull up the release wire 82, which causes the slide block 80 to retreat against the spring force of the compression coil spring 81 to thereby separate the securing pawl 80a of the slide block 80 from the rotation end of the other support arm 63, so that the locking of the centrally folded state of the footrest 10 can be removed.

Therefore, as shown in FIG. 16, the centrally folding of the footrest 10 by means of the folding operation is possible.

When compared with the previously described embodiment, according to the present embodiment, since removal of the locking of the footrest 10 can be achieved automatically by means of the folding operation, the folding and developing operation of the footrest 10 can be simplified further.

As can be clearly understood from the foregoing description, according to the invention, there can be obtained not only a footrest which is simple in structure, easy to fold, and high in strength, but also a stroller which is capable of mounting the footrest thereon, in folding, allows its hand-push frames to be contracted by a simple sliding operation, and, in folding and developing, can be locked and unlocked automatically and is thus easy to use.

What is claimed is:

1. A stroller including in a grip portion thereof an operation mechanism for locking a folding operation and removing such locking, said operation mechanism comprising:
a housing including:
a space capable of storing a member therein;
a lock lever disposed slidably in said housing;
a securing pawl having a large thickness and disposed in the leading end portion of said lock lever;
a lock removing lever disposed rotatably within said housing;
a pressing portion formed in a portion of said lock removing lever and exposed externally of said housing;
an operation portion formed in another portion of said lock removing lever and capable of pressing against said securing pawl; and
a release wire securing portion disposed in a member formed integrally with said lock removing lever,
when said lock lever is not allowed to slide, said securing pawl prevents said operation portion of said lock removing lever against rotation to thereby prevent the rotation of said pressing portion of said lock removing lever, so that said release wire securing portion is also prevented against rotation, and,
if said lock lever is slid, said securing pawl is moved to thereby allow said operation portion of said lock removing lever to rotate, so that said pressing portion of said lock removing lever is allowed to rotate and thus said release wire securing portion is also allowed to rotate,
a spring for normally energizing said lock lever to a locking position side, and, on a moving leading-end side of said securing pawl of said lock lever; and
an extension portion formed projectingly within said housing and an engaging groove formed in the vicinity of a leading end of said extension portion,
wherein if said lock lever is slid, then said securing pawl of said lock lever is moved to run up onto said extension portion and is thereafter engaged with said engaging groove and, if said pressing portion of said lock removing lever is further rotated, said securing pawl is moved by said spring to run up onto said extension portion again and is thereafter pulled back to the locking position side automatically.

2. A stroller comprising:
two right and left front legs respectively having front wheels mounted on the lower ends thereof;
two right and left rear legs respectively not only having their upper portions supported rotatably on the substantially central portions of said front legs but also having rear wheels mounted on the rear ends thereof;
two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;
a first open/close link formed in an X shape and mounted rotatably between said upper holders of said two front legs and the rear-portions of said two rear legs, the intersecting central portion of said first open/close link being supported by a pin;
a second open/close link formed in an X shape and mounted rotatably between the lower ends of said two hand-push frames and the substantially central portions of said two rear legs, the intersecting central portion of said second open/close link being supported by a pin; and,
a connecting portion connecting said horizontal portions of said two hand-push frames together through their joint portions and cooperating with said horizontal portions of said two hand-push frames in forming a grip portion, an operation mechanism included in said connecting portion, said operation mechanism comprising:
a spring for normally energizing a lock lever to a locking position side, and, on a moving leading-end side of a securing pawl of said lock lever; and
an extension portion formed projectingly within a housing and an engaging groove formed in the vicinity of a leading end of said extension portion, wherein if said lock lever is slid, then said securing pawl of said lock lever is moved to run up onto said extension portion and is thereafter engaged with said engaging groove and, if a pressing portion of a lock removing lever is further rotated, said securing pawl is moved by said spring to run up onto said extension portion again and is thereafter pulled back to the locking position-side automatically.

3. A stroller as set forth in claim 2, wherein, in said hand-push frames includes a lock pin projecting and retreating mechanism which, when said connecting portion is held linear with the upper portions of said hand-push frames, can be engaged with said upper holders, and also which, if said hand-push frames are rotated as the result of the lock removing operation of said connecting portion, can remove its engagement with said upper holders, and also wherein, in said hand-push frames, there is further included a release mechanism for connecting said operation mechanism to said lock pin projecting and retreating mechanism.

4. A stroller comprising:
two right and left front legs respectively having front wheels mounted on the lower ends thereof;
two right and left rear legs respectively not only having their upper portions supported rotatably on substantially central portions of said front legs but also having rear wheels mounted on rear ends thereof;
two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg, wherein, in said hand-push frame includes a lock pin projecting and retreating mechanism which, when said connecting portions is held linear with he upper portions of said hand-push frames, can be engaged with said upper holders, and also which, if said hand-push frames are rotated as the result of the lock removing operation of said connecting portion, can remove its engagement with said upper holders, and also wherein, in said hand-push frames, there is further included a release mechanism for connecting said operation mechanism to said lock pin projecting and retreating mechanism;

a first open/close link formed in an X shape and mounted rotatably between said upper holders of said two front legs and the rear portions of said two rear legs, the intersecting central portion of said first open/close link being supported by a pin;

a second open/close link formed in an X shape and mounted rotatably between the lower ends of said two hand-push frames and the substantially central portions of said two rear legs, the intersecting central portion of said second open/close ling being supported by a pin; and, a connecting portion connecting said horizontal portions of said hand-push frames together through their joint portions and cooperating with said horizontal portions of said two hand-push frames in forming a grip portion, an operation mechanism included in said connecting portion, said operation mechanism comprising:
  a housing including:
    a space capable of storing a member therein;
    a lock lever disposed slidably in said housing;
    a securing pawl having a large thickness and disposed in the leading end portion of said lock lever;
    a lock removing lever disposed rotatably within said housing;
    a pressing portion formed in a portion of said lock removing lever and exposed externally of said housing;
    an operation portion formed in another portion of said lock removing lever and capable of pressing against said securing pawl; and
    a release wire securing portion disposed in a member formed integrally with said lock removing lever, when said lock lever is not allowed to slide, said securing pawl prevents said operation portion of said lock removing lever against rotation to thereby prevent the rotation of said pressing portion of said lock removing lever, so that said release wire securing portion is also prevented against rotation, and, if said lock lever is slid, said securing pawl is moved to thereby allow said operation portion of said lock removing lever to rotate, so that said pressing portion of said lock removing lever is allowed to rotate and thus said release wire securing portion is also allowed to rotate.

5. A footrest comprising:
two footrest support arms connected to each other in their respective central portions and foldable in the central portions thereof in only the upward direction; and
a locking mechanism for locking said two footrest support arms in a horizontal state and a lock removing mechanism for removing said locking of said two footrest support arms,
wherein said locking mechanism is structured such that a securing pawl disposed in a moving block is allowed to move into a clearance produced in the vicinity of a connecting portion when said two support arms are held in said horizontal state and
wherein said lock removing mechanism is capable of retreating said securing pawl from said clearance produced in the vicinity of said connecting portion when said two support arms are held in said horizontal state.

6. A footrest as set forth in claim 5, further comprising:
a release mechanism for operating said locking and lock removing mechanisms.

7. A stroller comprising:
two right and left front legs respectively having front wheels mounted on the lower ends thereof;
two right and left rear legs respectively not only having their upper portions supported rotatably on the substantially central portions of said front legs but also having rear wheels mounted on the rear ends thereof;
two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;
a first open/close link formed in an X shape and mounted rotatably between said upper holders of said two front legs and the rear portions of said two rear legs, the intersecting central portion of said first open/close link being supported by a pin;
a second open/close link formed in an X shape and mounted rotatably between the lower ends of said two hand-push frames and the substantially central portions of said two rear legs, the intersecting central portion of said second open/close link being supported by a pin;
a connecting portion connecting said horizontal portions of said two hand-push frames together through their joint portions and cooperating with said horizontal portions of said two hand-push frames in forming a grip portion;
an operation mechanism which is disposed in said connecting portion and can be operated by hand to lock the rotation of said hand-push frames and remove said locking;
a lock pin projecting and retreating mechanism fixed to the inside of said hand-push frames in such a manner that, when said connecting portion is held linear with the upper portions of said hand-push frames, it can be engaged with said upper holders and, if said hand-push frames are rotated as the result of the lock removing operation of said connecting portion, it can be removed from its engagement with said upper holders; and
a release mechanism disposed within said hand-push frames for connecting said operation mechanism to said lock pin projecting and retreating mechanism; and
a footrest including:
  two footrest support arms connected to each other in their respective central portions and foldable in the central portions thereof only in the upward direction; and
  a locking mechanism for locking said two footrest support arms in a horizontal state and a lock removing mechanism for removing said locking of said two footrest support arms.

8. A stroller as set forth in claim 7, wherein said locking mechanism is structured such that a securing pawl disposed in a moving block is allowed to move into a clearance produced in the vicinity of a connecting portion when said two support arms are held in said horizontal state.

9. A stroller as set forth in claim 8, wherein said lock removing mechanism is capable of retreating said securing pawl from said clearance produced in the vicinity of said connecting portion when said two support arms are held in said horizontal state.

10. A stroller as set forth in claim 7, wherein said footrest is mounted on the lower portions of said two front legs in such a manner that the two ends of said footrest can be rotated.

11. A stroller as set forth in claim 8, wherein said footrest is mounted on the lower portions of said two front legs in such a manner that the two ends of said footrest can be rotated.

12. A stroller as set forth in claim 9, wherein said footrest is mounted on the lower portions of said two front legs in such a manner that two ends of said footrest can be rotated.

13. A stroller as set forth in claim 7, further comprising:
two armrest base portions respectively fixed to said two front legs and an armrest connected inclinably through fulcrum pins to the lower end portions of said two armrest base portions,
wherein, in folding said stroller, said armrest base portions and said armrest are folded to thereby be able to fold said stroller automatically.

14. A stroller as set forth in claim 7, further comprising:
a flexible guard circle is mounted between said two front legs.

15. A stroller as set forth in claim 13, further comprising:
a flexible guard circle is mounted between said two front legs.

16. A stroller as set forth in claim 7, further comprising:
a flexible sun visor mounted between two visor support rods respectively provided on the upper ends of said vertical portions of said two hand-push frames and extended therefrom in the advancing direction of said stroller.

17. A stroller as set forth in claim 7, wherein said locking mechanism is structured such that a securing pawl disposed in a moving block is allowed to move into a clearance produced in the vicinity of a connecting portion when said two support arms are held in said horizontal state.

18. A stroller as set forth in claim 17, wherein said lock removing mechanism is capable of retreating said securing pawl from said clearance produced in the vicinity of said connecting portion when said two support arms are held in said horizontal state.

19. A stoller as set forth in claim 7, wherein said footrest is mounted on the lower portions of said two front legs in such a manner that the two ends of said footrest can be rotated.

20. A stroller as set forth in claim 17, wherein said footrest is mounted on the lower portions of said two front legs in such a manner that the two ends of said footrest can be rotated.

21. A stroller as set forth in claim 18, wherein said footrest is mounted on the lower portions of said two front legs in such a manner that the two ends of said footrest can be rotated.

22. A stroller as set forth in claim 7, further comprising:
a release mechanism for operating said locking and lock removing mechanisms.

23. A stroller as set forth in claim 17, further comprising:
a release mechanism for operating said locking and lock removing mechanisms.

24. A footrest as set forth in claim 18, comprising:
a release mechanism for operating said locking and lock removing mechanisms.

25. A stroller, comprising:
two right and left front legs respectively having front wheels mounted on the lower ends thereof;
two right and left rear legs respectively not only having their upper portions supported rotatably on the substantially central portions of said front legs but also having rear wheels mounted on the rear ends thereof;
two right and left hand-push frames respectively rotatable in their peripheral direction, each hand-push frame including an upper portion curved in an inverted-L shape to form a horizontal portion and a vertically extending lower portion, said lower portion of said hand-push frame being inserted into upper and lower holders respectively fixed to the upper end and substantially central portion of said front leg and being supported by said upper and lower holders in such a manner that it can be slid in parallel to said front leg;
a first open/close link formed in an X shape and mounted rotatably between said upper holders of said two front legs and the rear portions of said two rear legs, the intersecting central portion of said first open/close link being supported by a pin;
a second open/close link formed in an X shape and mounted rotatably between the lower ends of said two hand-push frames and the substantially central portions of said two rear legs, the intersecting central portion of said second open/close link being supported by a pin;
a connecting portion connecting said horizontal portions of said two hand-push frames together through their joint portions and cooperating with said horizontal portions of said two hand-push frames in forming a grip portion;
an operation mechanism which is disposed in said connecting portion and can be operated by hand to lock the rotation of said hand-push frames and remove said locking;
a lock pin projecting and retreating mechanism fixed to the inside of said hand-push frames in such a manner that, when said connecting portion is held linear with the upper portions of said hand-push frames, it can be engaged with said upper holders and, if said hand-push frames are rotated as the result of the lock removing operation of said connecting portion, it can be removed from its engagement with said upper holders; and
a release mechanism disposed within said hand-push frames for connecting said operation mechanism to said lock pin projecting and retreating mechanism;
a footrest including:
two footrest support arms connected to each other in their respective central portions and foldable in the central portions thereof only in the upward direction;
an auxiliary release mechanism for operating said locking and lock removing mechanisms; and
a locking mechanism for locking said two footrest support arms in a horizontal state and a lock removing mechanism for removing said locking of said two footrest support arms, and the operation of said auxiliary release mechanism of said footrest is linked with the vertical movements of said two hand-push frames.

26. A stroller as set forth in claim 25, wherein said locking mechanism is structured such that a securing pawl disposed in a moving block is allowed to move into a clearance produced in the vicinity of a connecting portion when said two support arms are held in said horizontal state.

27. A stroller as set forth in claim 26, wherein said lock removing mechanism is capable of retreating said securing pawl from said clearance produced in the vicinity of said connecting portion when said two support arms are held in said horizontal state.

28. A stroller as set forth in claim 25, further comprising:
two armrest base portions respectively fixed to said two front legs and an armrest connected inclinably through fulcrum pins to the lower end portions of said two armrest base portions,
wherein, in folding said stroller, said armrest base portions and said armrest are folded to thereby be able to fold said stroller automatically.

29. A stroller as set forth in claim 25, further comprising:
a flexible guard circle is mounted between said two front legs.

30. A stroller as set forth in claim 28, further comprising:
a flexible guard circle is mounted between said two front legs.

31. A stroller as set forth in claim 25, further comprising:
a flexible sun visor mounted between two visor support rods respectively provided on the upper ends of said vertical portions of said two hand-push frames and extended therefrom in the advancing direction of said stroller.

32. A stroller as set forth in claim 25, wherein said locking mechanism is structured such that a securing pawl disposed in a moving block is allowed to move into a clearance produced in the vicinity of a connecting portion when said two support arms are held in said horizontal state.

33. A stroller as set forth in claim 32, wherein said lock removing mechanism is capable of retreating said securing pawl from said clearance produced in the vicinity of said connecting portion when said two support arms are held in said horizontal state.

34. A stroller as set forth in claim 25, wherein said footrest is mounted on the lower portions of said two front legs in such a manner that the two ends of said footrest can be rotated.

35. A stroller as set forth in claim 32, wherein said footrest is mounted on the lower portions of said two front legs in such a manner that the two ends of said footrest can be rotated.

36. A stroller as set forth in claim 33, wherein said footrest is mounted on the lower portions of said two front legs in such a manner that the two ends of said footrest can be rotated.

37. A stroller as set forth in claim 25, further comprising:
a release mechanism for operating said locking and lock removing mechanisms.

38. A stroller as set forth in claim 32, further comprising:
a release mechanism for operating said locking and lock removing mechanisms.

39. A stroller as set forth in claim 33, further comprising:
a release mechanism for operating said locking and lock removing mechanism.

* * * * *